United States Patent
Taghavi Nasrabadi et al.

(10) Patent No.: US 8,638,761 B2
(45) Date of Patent: Jan. 28, 2014

(54) LOW-LATENCY INTERLEAVING FOR LOW-DENSITY PARITY-CHECK (LDPC) CODING

(75) Inventors: Mohammad Hossein Taghavi Nasrabadi, San Diego, CA (US); Vincent Knowles Jones, Redwood City, CA (US); Didier Johannes Richard Van Nee, De Meem (NL); Geert Arnout Awater, Utrecht (NL)

(73) Assignee: QUALCOMM Incorporated, San Diego, CA (US)

( * ) Notice: Subject to any disclaimer, the term of this patent is extended or adjusted under 35 U.S.C. 154(b) by 205 days.

(21) Appl. No.: 13/253,569

(22) Filed: Oct. 5, 2011

(65) Prior Publication Data
US 2012/0327868 A1    Dec. 27, 2012

Related U.S. Application Data

(60) Provisional application No. 61/405,126, filed on Oct. 20, 2010, provisional application No. 61/390,286, filed on Oct. 6, 2010.

(51) Int. Cl.
*H04B 7/216* (2006.01)

(52) U.S. Cl.
USPC .................. 370/335; 370/343; 375/295

(58) Field of Classification Search
USPC ........... 370/335, 342–344; 375/295, 298, 299
See application file for complete search history.

(56) References Cited

U.S. PATENT DOCUMENTS

| | | | |
|---|---|---|---|
| 7,313,190 B2 | 12/2007 | Balakrishnan et al. | |
| 2005/0058212 A1 | 3/2005 | Shao | |
| 2006/0223460 A1 | 10/2006 | Himayat et al. | |
| 2008/0080641 A1 | 4/2008 | Kim | |
| 2009/0022242 A1 | 1/2009 | Waters et al. | |
| 2009/0282315 A1 | 11/2009 | Trachewsky et al. | |
| 2010/0246717 A1 | 9/2010 | Aldana | |
| 2010/0278283 A1 | 11/2010 | Sandhu | |
| 2011/0143696 A1 | 6/2011 | Luo et al. | |
| 2013/0145239 A1* | 6/2013 | Pi et al. | 714/807 |

OTHER PUBLICATIONS

International Search Report and Written Opinion—PCT/US2011/055152—ISA/EPO—Jan. 26, 2012.
Kadous, T., "COSFA: an efficient spatial multiplexing scheme for rate adaptive systems," Vehicular Technology Conference, 2003. VTC 2003-Fall 2003. 2003 IEEE 58th vol. 3, Oct. 6-9, 2003 pp. 1782-1787 vol. 3, Piscataway, NJ USA.
Thomas T A et al., "A method for improving the performance of successive cancellation in mobile spread mimo ofdm", Vehicular Technology Conference Proceedings, vol. 1, Sep. 24, 2002, -Sep. 28, 2002, pp. 18-22, XP010608508, New York, NY : IEEE, US DOI: 10.1109/VETECF.2002.1040293 ISBN: 978-0-7803-7467-6.

\* cited by examiner

*Primary Examiner* — Kerri Rose
(74) *Attorney, Agent, or Firm* — Dang M. Vo

(57) ABSTRACT

Certain aspects of the present disclosure relate to systems, devices, and methods for communicating over a plurality of tones and spatial streams. Modulation symbols may be mapped to tones and spatial streams so as to increase frequency and/or spatial diversity without substantially increasing latency. For certain aspects, this interleaving approach may be performed on low-density parity-check (LDPC) codewords.

40 Claims, 16 Drawing Sheets

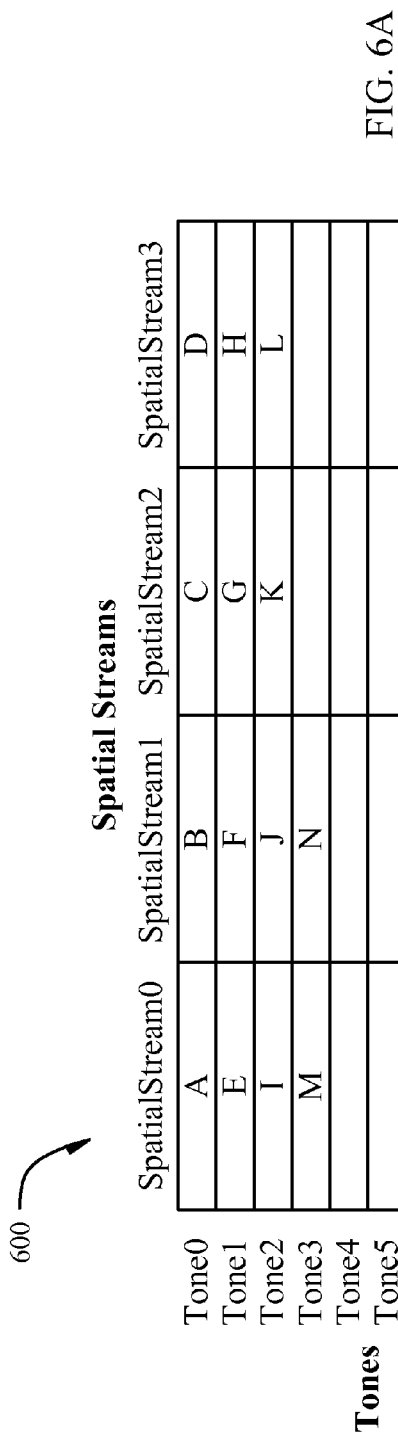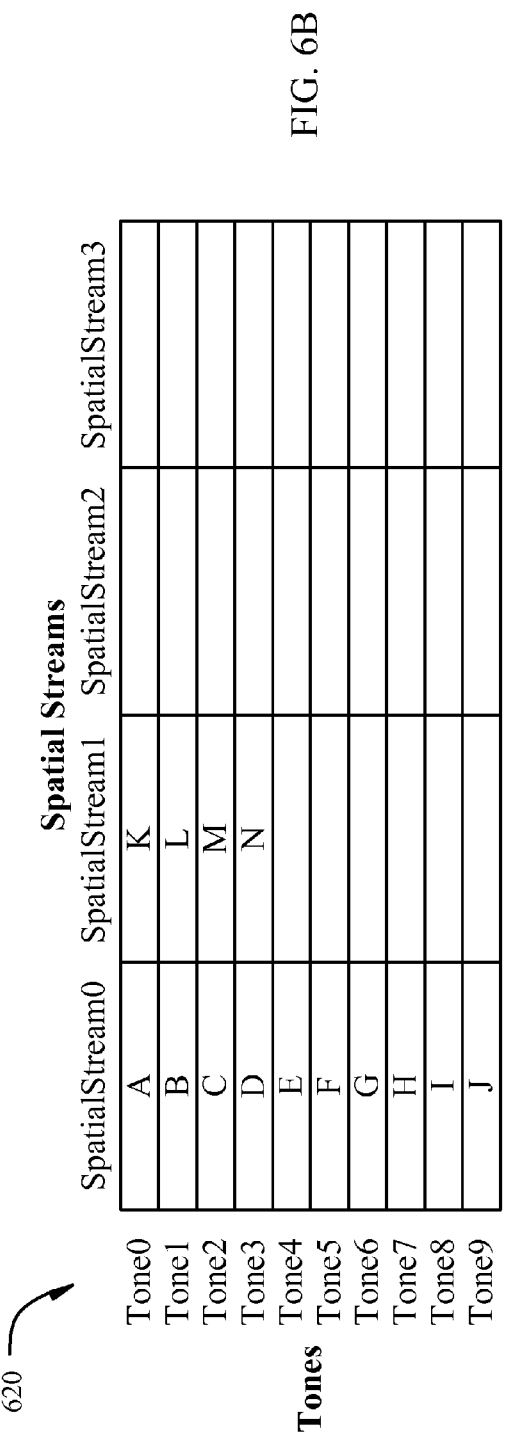
FIG. 6A
FIG. 6B

700

Tones / Spatial Streams

| | SpatialStream0 | SpatialStream1 | SpatialStream2 | SpatialStream3 |
|---|---|---|---|---|
| Tone0 | A | B | C | D |
| Tone1 | | | | |
| Tone2 | E | F | G | H |
| Tone3 | | | | |
| Tone4 | I | J | K | L |
| Tone5 | | | | |
| Tone6 | M | N | | |
| Tone7 | | | | |
| Tone8 | | | | |
| Tone9 | | | | |

Tones / Spatial Streams

| | SpatialStream0 | SpatialStream1 | SpatialStream2 | SpatialStream3 |
|---|---|---|---|---|
| Tone0 | A | B | C | D |
| Tone1 | | | | |
| Tone2 | | | | |
| Tone3 | E | F | G | H |
| Tone4 | | | | |
| Tone5 | | | | |
| Tone6 | I | J | K | L |
| Tone7 | | | | |
| Tone8 | | | | |
| Tone9 | M | N | | |

| Tones | Spatial Streams | | | |
|---|---|---|---|---|
| | SpatialStream0 | SpatialStream1 | SpatialStream2 | SpatialStream3 |
| Tone0 | A | E | I | M |
| Tone1 | | | | |
| Tone2 | | | | |
| Tone3 | B | F | J | N |
| Tone4 | | | | |
| Tone5 | | | | |
| Tone6 | C | G | K | |
| Tone7 | | | | |
| Tone8 | | | | |
| Tone9 | D | H | L | |

FIG. 9B

| Tones | Spatial Streams | | | |
|---|---|---|---|---|
| | SpatialStream0 | SpatialStream1 | SpatialStream2 | SpatialStream3 |
| Tone0 | A | | | |
| Tone1 | | E | H | K |
| Tone2 | B | | | |
| Tone3 | | F | I | L |
| Tone4 | | | | |
| Tone5 | C | | | |
| Tone6 | | G | J | M |
| Tone7 | D | | | |
| Tone8 | | | | N |
| Tone9 | | | | |

FIG. 10A

Tones \ Spatial Streams

| | SpatialStream0 | SpatialStream1 | SpatialStream2 | SpatialStream3 |
|---|---|---|---|---|
| Tone0 | 1 | 1 | 1 | 1 |
| Tone1 | 2 | 2 | 2 | 2 |
| Tone2 | 3 | 3 | 3 | 3 |
| Tone3 | 1 | 1 | 1 | 1 |
| Tone4 | 2 | 2 | 2 | 2 |
| Tone5 | 3 | 3 | 3 | 3 |
| Tone6 | 1 | 1 | 1 | 1 |
| Tone7 | 2 | 2 | 2 | 2 |

FIG. 10B

Tones \ Spatial Streams

| | SpatialStream0 | SpatialStream1 | SpatialStream2 | SpatialStream3 |
|---|---|---|---|---|
| Tone0 | 1 | 1 | 1 | 1 |
| Tone1 | 3 | 3 | 3 | 3 |
| Tone2 | 2 | 2 | 2 | 2 |
| Tone3 | 1 | 1 | 1 | 1 |
| Tone4 | 3 | 3 | 3 | 3 |
| Tone5 | 2 | 2 | 2 | 2 |
| Tone6 | 1 | 1 | 1 | 1 |
| Tone7 | 3 | 3 | 3 | 3 |
| Tone8 | 2 | 2 | 2 | 2 |
| Tone9 | 1 | 1 | 1 | 2 |

LOW-LATENCY INTERLEAVING FOR LOW-DENSITY PARITY-CHECK (LDPC) CODING

CROSS-REFERENCE TO RELATED APPLICATIONS

This application claims benefit of U.S. Provisional Patent Application Ser. No. 61/390,286, filed Oct. 6, 2010 and U.S. Provisional Patent Application Ser. No. 61/405,126, filed Oct. 20, 2010, both of which are herein incorporated by reference in their entirety.

BACKGROUND

1. Field

Certain aspects of the present disclosure generally relate to wireless communications and, more particularly, to interleaving over a plurality of frequencies (or tones) and spatial streams.

2. Background

In order to address the issue of increasing bandwidth requirements demanded for wireless communications systems, different schemes are being developed to allow multiple user terminals to communicate with a single access point by sharing the channel resources while achieving high data throughputs. Multiple Input Multiple Output (MIMO) technology represents one such approach that has recently emerged as a popular technique for next generation communication systems. MIMO technology has been adopted in several emerging wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single Access Point (AP) and multiple user stations (STAs), concurrent transmissions may occur on multiple channels toward different stations, both in the uplink and downlink direction. Many challenges are present in such systems.

SUMMARY

Certain aspects of the present disclosure provide an apparatus for wireless communications. The apparatus generally includes a processing system and a transmitter. The processing system is typically configured to map a plurality of bits to a plurality of modulation symbols. In some aspects, the plurality of bits are associated with a plurality of codewords. The processing system is further configured to map each of the plurality of modulation symbols to a tone and a spatial stream. The tone is one of a plurality of tones available for transmission, and the spatial stream is one of a plurality of spatial streams available for the transmission. The transmitter is generally configured to transmit the mapped modulation symbols. In some aspects, a subset of the plurality of modulation symbols corresponding to consecutive bits associated with one of the plurality of codewords is approximately uniformly mapped among the plurality of spatial streams. In some aspects, the modulation symbols of the subset that are mapped to the same spatial stream are mapped to non-adjacent tones in the plurality of tones.

Certain aspects of the present disclosure provide a method for wireless communications. The method generally includes mapping a plurality of bits to a plurality of modulation symbols. In some aspects, the plurality of bits are associated with a plurality of codewords. The method further includes mapping each of the plurality of modulation symbols to a tone and a spatial stream and transmitting the mapped modulation symbols. The tone is one of a plurality of tones available for transmission, and the spatial stream is one of a plurality of spatial streams available for the transmission. In some aspects, a subset of the plurality of modulation symbols corresponding to consecutive bits associated with one of the plurality of codewords is approximately uniformly mapped among the plurality of spatial streams. In some aspects, the modulation symbols of the subset that are mapped to the same spatial stream are mapped to non-adjacent tones in the plurality of tones.

Certain aspects of the present disclosure provide an apparatus for wireless communications. The apparatus generally includes means for mapping a plurality of bits to a plurality of modulation symbols. In some aspects, the plurality of bits are associated with a plurality of codewords. The apparatus further includes means for mapping each of the plurality of modulation symbols to a tone and a spatial stream and means for transmitting the mapped modulation symbols. The tone is one of a plurality of tones available for transmission, and the spatial stream is one of a plurality of spatial streams available for the transmission. In some aspects, a subset of the plurality of modulation symbols corresponding to consecutive bits associated with one of the plurality of codewords is approximately uniformly mapped among the plurality of spatial streams. In some aspects, the modulation symbols of the subset that are mapped to the same spatial stream are mapped to non-adjacent tones in the plurality of tones.

Certain aspects of the present disclosure provide a computer program product for wireless communications. The computer program product may include a computer-readable medium comprising instructions. When executed, the instructions may cause an apparatus to map a plurality of bits to a plurality of modulation symbols. In some aspects, the plurality of bits are associated with a plurality of codewords. When executed, the instructions may further cause the apparatus to map each of the plurality of modulation symbols to a tone and a spatial stream and to transmit the mapped modulation symbols. The tone is one of a plurality of tones available for transmission, and the spatial stream is one of a plurality of spatial streams available for the transmission. In some aspects, a subset of the plurality of modulation symbols corresponding to consecutive bits associated with one of the plurality of codewords is approximately uniformly mapped among the plurality of spatial streams. In some aspects, the modulation symbols of the subset that are mapped to the same spatial stream are mapped to non-adjacent tones in the plurality of tones.

Certain aspects of the present disclosure provide a wireless node. The node generally includes at least one antenna, a processing system, and a transmitter. The processing system is typically configured to map a plurality of bits to a plurality of modulation symbols. In some aspects, the plurality of bits are associated with a plurality of codewords. The processing system is further configured to map each of the plurality of modulation symbols to a tone and a spatial stream. The tone is one of a plurality of tones available for transmission, and the spatial stream is one of a plurality of spatial streams available for the transmission. The transmitter is configured to transmit, via the at least one antenna, the mapped modulation symbols. In some aspects, a subset of the plurality of modulation symbols corresponding to consecutive bits associated with one of the plurality of codewords is approximately uniformly mapped among the plurality of spatial streams. In some aspects, the modulation symbols of the subset that are mapped to the same spatial stream are mapped to non-adjacent tones in the plurality of tones.

Certain aspects of the present disclosure provide an apparatus for wireless communications. The apparatus generally includes a receiver configured to receive a plurality of modulation symbols corresponding to bits associated with a plurality of codewords over a plurality of tones and a plurality of spatial streams. In some aspects, a subset of the plurality of modulation symbols corresponding to consecutive bits associated with one of the plurality of codewords is approximately uniformly distributed over the plurality of spatial streams. In some aspects, the modulation symbols of the subset that are received in the same spatial stream are distributed over non-adjacent tones in the plurality of tones. The apparatus may further include a deinterleaver configured to arrange the subset of the received modulation symbols into an original order corresponding to the one of the plurality of codewords.

Certain aspects of the present disclosure provide a method for wireless communications. The method generally includes receiving a plurality of modulation symbols corresponding to bits associated with a plurality of codewords over a plurality of tones and a plurality of spatial streams. In some aspects, a subset of the plurality of modulation symbols corresponding to consecutive bits associated with one of the plurality of codewords is approximately uniformly distributed over the plurality of spatial streams. In some aspects, the modulation symbols of the subset that are received in the same spatial stream are distributed over non-adjacent tones in the plurality of tones. The method may further include arranging the subset of the received modulation symbols into an original order corresponding to the one of the plurality of codewords.

Certain aspects of the present disclosure provide an apparatus for wireless communications. The apparatus generally includes means for receiving a plurality of modulation symbols corresponding to bits associated with a plurality of codewords over a plurality of tones and a plurality of spatial streams. In some aspects, a subset of the plurality of modulation symbols corresponding to consecutive bits associated with one of the plurality of codewords is approximately uniformly distributed over the plurality of spatial streams. In some aspects, the modulation symbols of the subset that are received in the same spatial stream are distributed over non-adjacent tones in the plurality of tones. The apparatus may further include means for arranging the subset of the received modulation symbols into an original order corresponding to the one of the plurality of codewords.

Certain aspects of the present disclosure provide a computer program product for wireless communications. The computer program product may include a computer-readable medium comprising instructions. When executed, the instructions may cause an apparatus to receive a plurality of modulation symbols corresponding to bits associated with a plurality of codewords over a plurality of tones and a plurality of spatial streams. In some aspects, a subset of the plurality of modulation symbols corresponding to consecutive bits associated with one of the plurality of codewords is approximately uniformly distributed over the range of spatial streams. In some aspects, the modulation symbols of the subset that are received in the same spatial stream are distributed over non-adjacent tones in the plurality of tones. When executed, the instructions may further cause the apparatus to arrange the subset of the received modulation symbols into an original order corresponding to the one of the plurality of codewords.

Certain aspects of the present disclosure provide a wireless node. The node generally includes at least one antenna and a receiver configured to receive, via the at least one antenna, a plurality of modulation symbols corresponding to bits associated with a plurality of codewords over a plurality of tones and a plurality of spatial streams. In some aspects, a subset of the plurality of modulation symbols corresponding to consecutive bits associated with one of the plurality of codewords is approximately uniformly distributed over the range of spatial streams. In some aspects, the modulation symbols of the subset that are received in the same spatial stream are distributed over non-adjacent tones in the plurality of tones. The node may further include a deinterleaver configured to arrange the subset of the received modulation symbols into an original order corresponding to the one of the plurality of codewords.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 6A-10B illustrate various aspects of symbol mapping to the matrix of FIG. 5, in accordance with certain aspects of the present disclosure.

DETAILED DESCRIPTION

Figure 1:
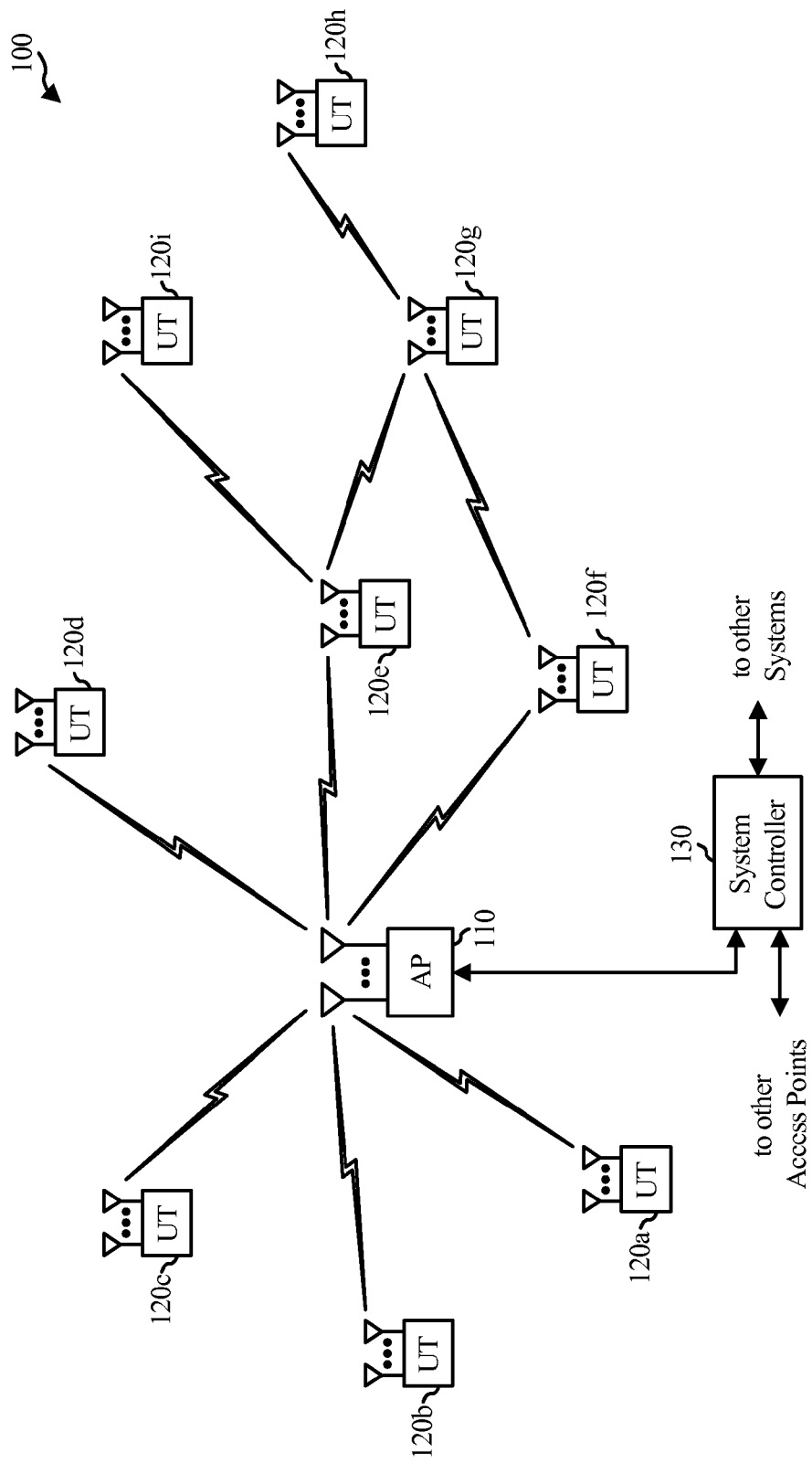
FIG. 1 illustrates a diagram of a wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the described aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to a different user terminal. A TDMA system may implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 3GPP-LTE ($3^{rd}$ Generation Partnership Project Long Term Evolution) or other standards.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or be known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or be known as a station (STA), a subscriber station, a subscriber unit, a mobile station (MS), a remote station, a remote terminal, a user terminal (UT), a user agent, a user device, user equipment (UE), a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a tablet, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

FIG. 1 illustrates an aspect of a wireless communications system 100 with access points and user terminals. The system 100 may comprise a multiple-access multiple-input multiple-output (MIMO) system, for example. For simplicity, only one access point 110 is shown in FIG. 1. An access point is generally a fixed station that communicates with the user terminals and may also be referred to as a base station or using some other terminology. A user terminal may be fixed or mobile and may also be referred to as a mobile station, a wireless device, or some other terminology. The access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, the AP 110 may be configured to communicate with both SDMA and non-SDMA user terminals. This approach may conveniently allow older versions of user terminals ("legacy" stations) that do not support SDMA to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of sub-bands with OFDM, and so on. Each selected user terminal may transmit user-specific data to and/or receive user-specific data from the access point. In general, each selected user terminal may be equipped with one or multiple antennas (i.e., $N_{ut} \geq 1$). The K selected user terminals can have the same number of antennas, or one or more user terminals may have a different number of antennas.

The system 100 may be a time division duplex (TDD) system or a frequency division duplex (FDD) system. For a TDD system, the downlink and uplink share the same frequency band. For an FDD system, the downlink and uplink use different frequency bands. The system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, where each time slot may be assigned to a different user terminal 120.

Figure 2:
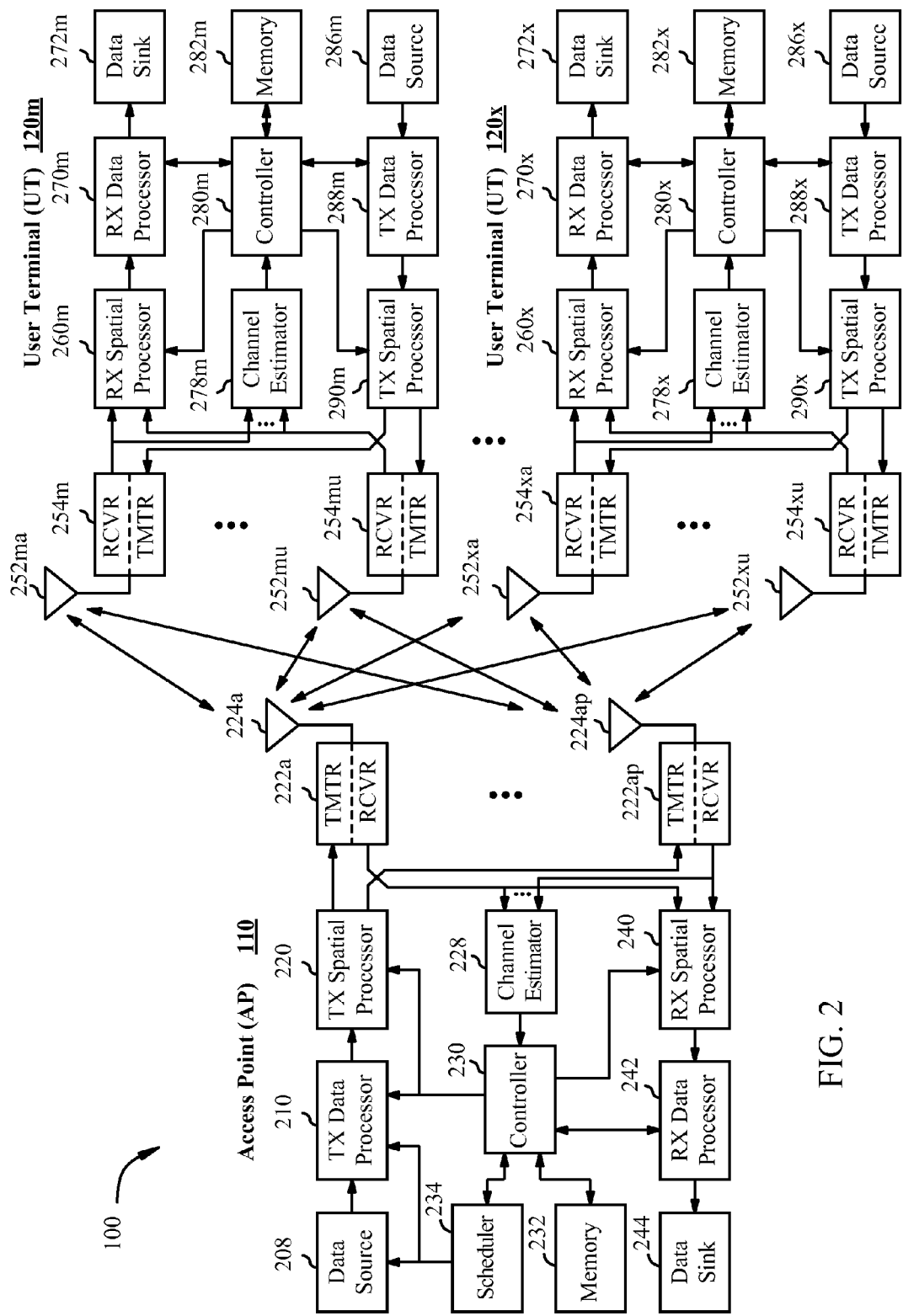
FIG. 2 illustrates a block diagram of an example access point and user terminals in accordance with certain aspects of the present disclosure.

FIG. 2 illustrates a block diagram of the access point 110 and two user terminals 120m and 120x in system 100. The access point 110 is equipped with $N_t$ antennas 224a through 224ap. The user terminal 120m is equipped with $N_{ut,m}$ antennas 252ma through 252mu, and the user terminal 120x is equipped with $N_{ut,x}$ antennas 252xa through 252xu. The access point 110 is a transmitting entity for the downlink and a receiving entity for the uplink. The user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, and $N_{dn}$ user terminals are selected for simultaneous transmission on the downlink. $N_{up}$ may or may not be equal to $N_{dn}$, and $N_{up}$ and $N_{dn}$ may be static values or may change for each scheduling interval. Beam-steering or some other spatial processing technique may be used at the access point 110 and/or the user terminal 120.

On the uplink, at each user terminal 120 selected for uplink transmission, a TX data processor 288 receives traffic data from a data source 286 and control data from a controller 280. The TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252, for example to transmit to the access point 110.

In some aspects, $N_{up}$ user terminals may be scheduled for simultaneous transmission on the uplink. Each of these user terminals may perform spatial processing on its respective data symbol stream and transmit its respective set of transmit symbol streams on the uplink to the access point 110.

At the access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing may be performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at the access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. The TX data processor 210 provides $N_{dn}$ downlink data symbol streams for the $N_{dn}$ user terminals. A TX spatial processor 220 performs spatial processing (such as precoding or beamforming) on the $N_{dn}$ downlink data symbol streams and provides $N_{ap}$ transmit symbol streams for the $N_{ap}$ antennas. Each transmitter unit 222 receives and processes a respective transmit symbol stream to generate a downlink signal. $N_{ap}$ transmitter units 222 may provide $N_{ap}$ downlink signals for transmission from $N_{ap}$ antennas 224 to the user terminals 120.

At each user terminal 120, $N_{ut,m}$ antennas 252 receive the $N_{ap}$ downlink signals from the access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal 120. The receiver spatial processing may be performed in accordance with the CCMI, MMSE, or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance, and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. The controller 230 derives the spatial filter matrix for the access point based on the effective uplink channel response matrix $H_{up,eff}$. The controller 280 for each user terminal may send feedback information (e.g., the downlink and/or uplink eigenvectors, eigenvalues, SNR estimates, and so on) to the access point 110. The controllers 230 and 280 may also control the operation of various processing units at the access point 110 and user terminal 120, respectively.

Figure 3:
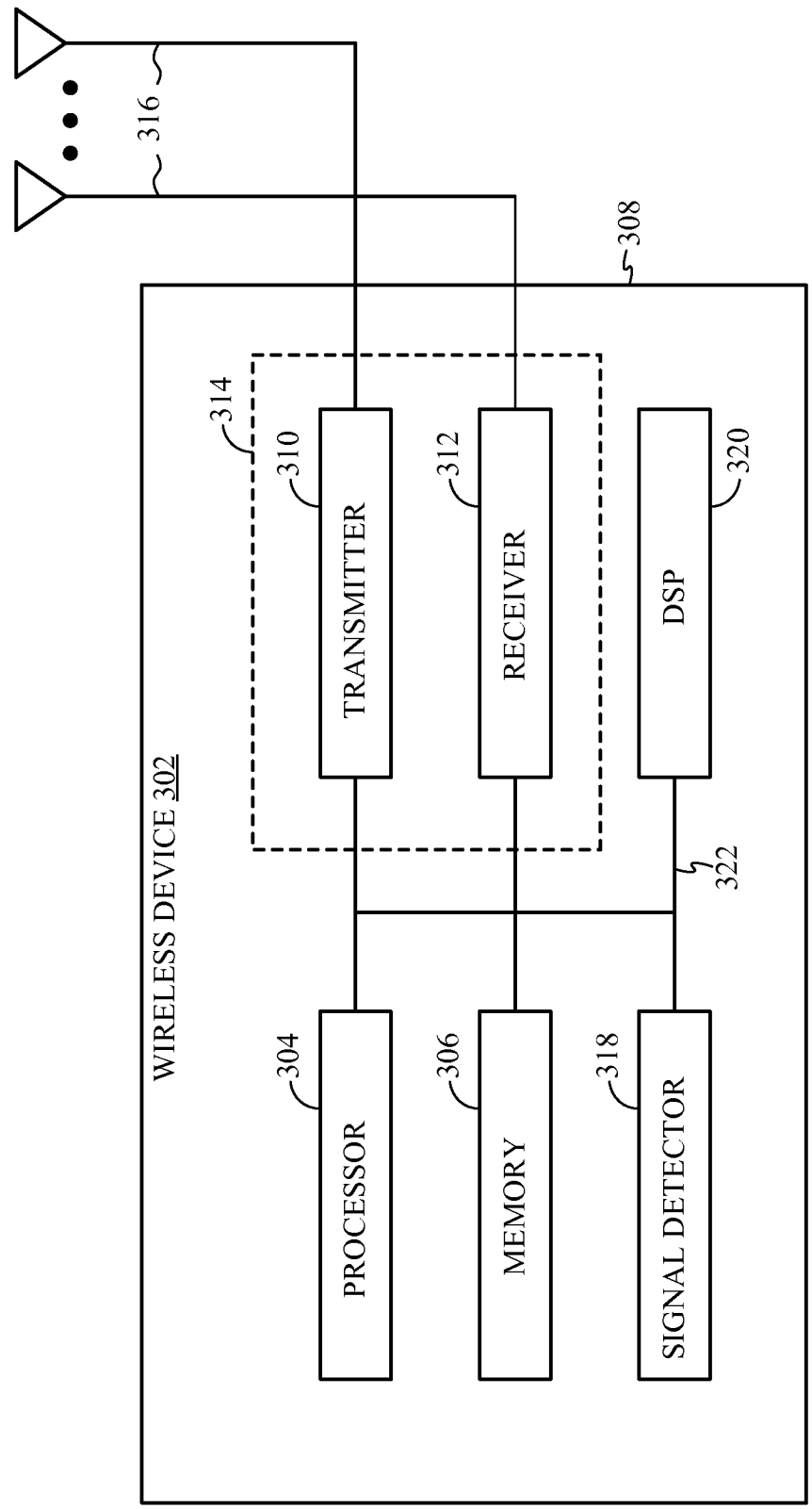
FIG. 3 illustrates a block diagram of an example wireless device in accordance with certain aspects of the present disclosure.

FIG. 3 illustrates various components that may be utilized in a wireless device 302 that may be employed within the communications system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 may perform logical and arithmetic operations based on program instructions stored within the memory 306. The instructions in the memory 306 may be executable to implement the methods described herein.

The processor 304 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or plurality of transmit antennas 316 may be attached to the housing 308 and electrically coupled to the transceiver 314. Although not shown, the wireless device 302 may also include multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density, and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example Low-Latency Interleaving for LDPC and Other Coding Schemes

In some aspects, the system 100 illustrated in FIG. 1 operates in accordance with the IEEE 802.11ac wireless communications standard. IEEE 802.11ac represents an amendment to the IEEE 802.11 standard that allows for higher throughput in 802.11 wireless networks. The higher throughput may be realized through several measures, such as parallel transmissions to multiple stations (STAs) at once. In some aspects, a wider channel bandwidth (e.g., 80 MHz or 160 MHz) is used. The IEEE 802.11ac standard may also sometimes be referred to as the Very High Throughput (VHT) wireless communications standard.

In some aspects, the system 100 illustrated in FIG. 1 uses OFDM. As described above, a plurality of sub-carriers may be independently modulated with data in an OFDM system. Further, in some aspects of an OFDM system, a plurality of spatial channels may be used to transmit each sub-carrier. In some aspects, the spatial channels are referred to as spatial streams. Each spatial stream may correspond to an antenna of a wireless node and may be transmitted using that antenna, for example. Although certain aspects below will be described with respect to an OFDM system, those of skill in the art will appreciate that other systems may be used and that the system 100 may implement other means or modes of communication.

In some systems, such as high-rate OFDM systems, the length of a codeword (e.g., a low-density parity-check (LDPC) codeword) is smaller than the number of bits in an OFDM symbol. This means the bits in each codeword are transmitted only through a fraction of the tones (subcarriers), thus not achieving full frequency diversity. Full interleaving or increasing the LDPC block length to overcome this problem results in additional hardware complexity and/or latency. Increased latency may delay the processing of data by a receiver and, in certain situations, may disrupt communications, for example when communications cannot be decoded quickly enough to support time-sensitive transmissions and/or a desired quality of service (QoS).

Accordingly, what is desired are techniques and apparatus for operating with decreased latency interleaving.

Certain aspects of the present disclosure utilize an interleaving approach for LDPC coding with small interleaving depth. The depth may be sufficient enough to ensure the coded bits from each codeword are transmitted across a wide range of OFDM tones that covers a significant portion of the OFDM spectrum. This interleaving approach results in a smaller latency when compared to interleavers designed for BCC.

Certain aspects of the present disclosure may be used to interleave or permute symbols prior to transmission. In some aspects, the symbols correspond to a codeword or comprise a subset of the codeword. The symbols may comprise consecutive symbols from the codeword and may be transmitted over non-adjacent tones using a selected spatial stream. The symbols may comprise modulated symbols (e.g., as mapped by a 64-QAM mapper) and may be transmitted in a single OFDM symbol. Modulated symbols from other codewords may also be transmitted in the OFDM symbol. In some aspects, the symbols of at least one codeword may be mapped to a tone and a spatial stream for transmission. By mapping as described herein, the symbols of the codeword may be spread among the tones and/or spatial streams to provide frequency, time, and/or spatial diversity when transmitting. In some aspects, adjacent logical tones are mapped to non-adjacent physical tones. In some aspects, the symbols of the codeword are approximately uniformly spread among all available tones and all available spatial streams. Such permutation, interleaving, and/or mapping may be performed without substantially increasing the latency of reception. Thus, a codeword may be transmitted with an increased frequency, time, and/or spatial diversity without substantially delaying communications. In some aspects, processing latency at a receiver is reduced as compared to known systems.

Figure 4:
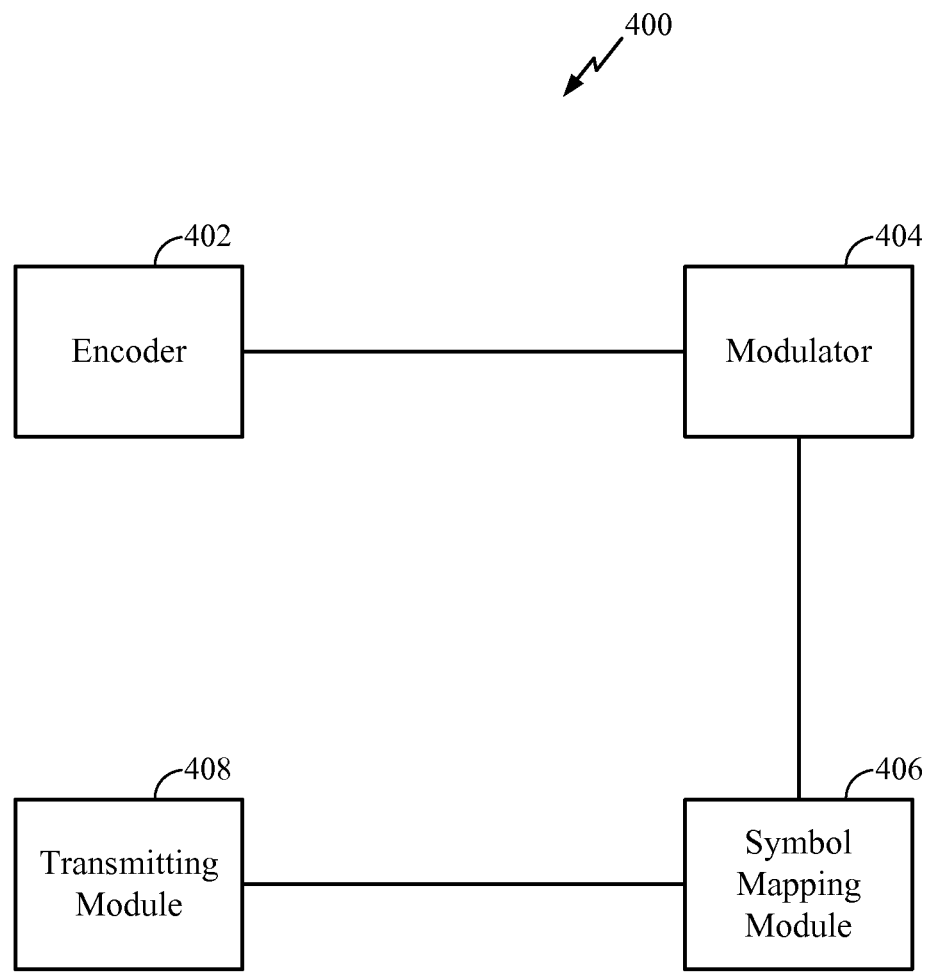
FIG. 4 illustrates a block diagram of an example transmitting entity, in accordance with certain aspects of the present disclosure.

FIG. 4 is a block diagram of a transmitting entity, such as a wireless node 400 for use within the system 100. The wireless node 400 may be used to transmit information. For example, the wireless node 400 may be an AP 110 illustrated in FIG. 1 or FIG. 2. In such aspects, the wireless node 400 may be used to transmit information to one of the user terminals 120. Similarly, the wireless node 400 may be any of the user terminals 120 illustrated in FIG. 1 or FIG. 2. In such aspects, the wireless node 400 may be used to transmit information to the AP 110. The wireless node 400 may be implemented as described with respect to the wireless device 302 illustrated in FIG. 3.

The wireless node 400 may comprise an encoder 402 for encoding a stream of bits. The bits may represent data or information for transmission. For example, the bits may be received from the data source 208 or the data source 286 illustrated in FIG. 2. In some aspects, the encoder 402 encodes the stream of bits into codewords. The stream may be encoded using a forward error correction (FEC) code, for example. In one aspect, the FEC code used by the encoder 402 comprises a block code for generating the codewords. For example, the block code may comprise a low-density parity-check (LDPC) code, a Reed-Solomon code, or any of other various suitable block codes. The encoder 402 may be implemented using the TX data processor 210 or 288 or the controller 230 or 280, as illustrated in FIG. 2. Further, the encoder 402 may be implemented using the processor 304 or the DSP 320 illustrated in FIG. 3.

The wireless node 400 may further comprise a modulator 404 for modulating bits in the codewords determined by the encoder 402. The modulator 404 may determine a plurality of symbols from the bits in the codewords, for example, by mapping bits in the codewords to a plurality of symbols according to a constellation. In one aspect, the modulator 404 comprises a 64-QAM (quadrature amplitude modulation) mapper. The 64-QAM mapper may map or determine a symbol from every six bits in a codeword. The modulator 404 may be implemented using the TX data processor 210 or 288 or the controller 230 or 280, as illustrated in FIG. 2. Further, the modulator 404 may be implemented using the processor 304 or the DSP 320 illustrated in FIG. 3.

The wireless node 400 may additionally comprise a symbol mapping module 406 for mapping each of the symbols from the modulator 404 to a tone and a spatial stream. The tones may comprise physical channels or sub-carriers. As described above, each of the tones may be independently modulated with data in an OFDM system. Further, as also described above, one or more spatial streams may be used to transmit data over each tone.

Figure 5:
FIG. 5 illustrates an example conceptual matrix of tones versus spatial streams, in accordance with certain aspects of the present disclosure.

In one aspect, an OFDM symbol is defined by combining each tone in the range of all tones available for transmitting data in a system, for example the system 100, with each spatial stream in the range of all spatial streams available for transmitting data in the system. For example, an OFDM symbol may be conceptualized as a table or matrix, where each column of the matrix corresponds to an available spatial stream and each row corresponds to an available tone, as illustrated in FIG. 5. If there are $N_S$ spatial streams in the system and $N_{tones}$ tones in the system, the matrix will have $N_S$ columns and $N_{tones}$ rows. For certain aspects, the spatial streams may be represented by the rows instead of the columns, and the tones may be represented by the columns instead of the rows.

In the example conceptual matrix 500 illustrated in FIG. 5, there are four spatial streams and ten tones available for transmission in the system. The illustrated aspect is merely an example, however, and each OFDM symbol may comprise a greater or fewer number of spatial streams and/or tones. For example, in an 80 MHz MIMO-OFDM system, there may be four spatial streams and 234 tones in an OFDM symbol. In the illustrated aspects, the tones are illustrated as Tone0-Tone9. Those of skill in the art will appreciate that these labels are used merely for ease of illustration, and that the tones may actually be frequencies in a range used by the system to transmit data. In some aspects, however, the numerals 0-9 in the illustrated Tone0-Tone9 may be referred to as an index for that respective tone (i.e., a tone index). Similarly, the numerals 0-3 in the illustrated SpatialStream0-SpatialStream3 may be thought of as an index for that respective spatial stream (i.e., a spatial stream index). Those of skill in the art will appreciate that there may be tones between those illustrated in FIG. 5 that are not available for transmission of user data. For example, certain tones in an OFDM system may be reserved for pilot, guard, DC, or control signals.

In some aspects, the number of modulated symbols in a codeword will be less than the number of combinations of tones and spatial streams in an OFDM module. Thus, modulated symbols from a plurality of codewords may be transmitted in a single OFDM symbol. For example, in the 80 MHz MIMO-OFDM system described above, the modulated symbols of approximately three different codewords may be transmitted in an OFDM symbol.

Each combination of a tone and a spatial stream, for example as identified at the intersection of a row and a column and shown in the cells of the matrix 500 illustrated in FIG. 5, may be used to set parameters for transmitting a modulated symbol. The OFDM symbol, which may be referred to as a transmission symbol at a transmitting device and a reception symbol at a receiving device, may comprise the collection of all of the combinations of a tone and a spatial stream.

The symbol mapping module 406 may be implemented using the TX data processor 210 or 288, or the controller 230 or 280, illustrated in FIG. 2. Further, the symbol mapping module 406 may be implemented using the processor 304 or the DSP 320 illustrated in FIG. 3. In some aspects, an inverse fast Fourier transform (IFFT) module is used to implement the symbol mapping module 406 or a portion thereof. Functionality of the symbol mapping module 406 will be described in additional detail below.

The wireless node 400 may also comprise a transmitting module 408 for transmitting the modulated symbols that have been mapped by the symbol mapping module 406. In one aspect, the symbols are written into the cells of a matrix or table as discussed above, and the symbols are read from the matrix for transmission by the transmitting module 408. For example, each symbol may be transmitted over the tone corresponding to its matrix cell using the spatial stream corresponding to its matrix cell. In some aspects, each spatial stream corresponds to a separate antenna, and all of the symbols mapped to a given spatial stream are transmitted using the same antenna. In some aspects, an output port or other form of output may be included to output symbols to the respective antennas. In some aspects, the symbols are not actually written into cells of a matrix, but the symbols are still mapped to a combination of a tone and a spatial stream derived from the matrix, for example using a lookup function or by deriving the values mathematically using an index.

In some aspects, the transmitting module 408 is configured to wirelessly transmit the mapped symbols, for example to an AP 110 or a user terminal 120. The transmitting module 408 may be implemented using a transmitter (e.g., the transmitter 310 illustrated in FIG. 3) or a combination of transmitters (e.g., the transmitters 222a-222ap, 254m-254mu, or 254xa-254xu illustrated in FIG. 2). The transmitting module 408 may be implemented in a transceiver. In some aspects, functionality of the transmitting module 408 is implemented in other modules, and need not be implemented separately from the other modules illustrated in FIG. 4. In some aspects, the transmitting module 408 comprises an antenna and a transceiver, for example the antenna 224 and the transceiver 222, or the antenna 252 and the transceiver 254. Messages may be transmitted via the antenna with the transmitting module 408. In some aspects, messages may be transmitted via a plurality of antennas, as discussed above.

Modulated symbols of a codeword that are sequentially mapped to a combination of a tone and a spatial stream according to a row-by-row scheme with respect to the matrix 600 as shown in FIG. 6A, or according to a column-by-column scheme with respect to the matrix 620 as shown in FIG. 6B, may not be transmitted with sufficient spatial and/or frequency diversity. For example, when the number of modulated symbols in a codeword is less than the number of combinations of a tone and spatial stream in an OFDM symbol, as discussed above, the codeword may be transmitted using a limited range of tones and/or using a limited range of spatial streams.

In the aspect illustrated in FIG. 6A, a codeword comprises modulated symbols A-N as an example. Throughout this description, the example codeword comprising symbols A-N will be referred to as "the Codeword" to distinguish it from other generic codewords. Those of skill in the art will appreciate that a codeword may comprise a greater or fewer number of symbols than illustrated. For example, in the 80 MHz MIMO-OFDM system described above, there are 324 symbols in each codeword. The illustrated Codeword and symbol representations are used merely for ease of illustration and explanation.

After being mapped to combinations row by row, the Codeword illustrated in FIG. 6A may be transmitted using only approximately one third of the available tones. Similarly, after the same Codeword is mapped to combinations column by column, as shown in FIG. 6B, the Codeword may be transmitted using only half of the spatial streams. If the length of a codeword were to be increased to more closely match the number of combinations in the OFDM symbol, the complexity of the encoder 402 may similarly increase, as may the latency of communications in the system 100.

Methods, modes, and schemes described herein, however, may be used to transmit symbols of a codeword across a wider range of tones and/or spatial streams. In some aspects, the increase in diversity from such transmission is achieved without a substantial increase in complexity and/or latency. In some aspects, latency is reduced. As those of skill in the art will recognize based on the descriptions below, the physical tones used to transmit at least a subset of consecutive symbols of a codeword may be permuted with respect to logical tones of those symbols. For example, any symbol in the subset mapped to the same spatial stream will be transmitted over a tone that is non-adjacent a tone of another symbol in the subset mapped to the same spatial stream. In some aspects, the symbols in the subset are mapped to tone-and-spatial-stream combinations that are approximately uniformly distributed over the range of all tones and the range of all spatial streams.

Returning now to functionality of the symbol mapping module 406, various methods, modes, or schemes that the symbol mapping module 406 may use to map modulated symbols (e.g., from the modulator 404) to a tone and spatial stream will be described. Those of skill in the art will appreciate that the methods, modes, or schemes described herein are only examples used to illustrate certain disclosed concepts, and that other methods, modes, or schemes of mapping modulated symbols to a transmission symbol may be used.

The methods, modes, or schemes below are described with respect to the example Codeword having symbols A-N as discussed above. As further discussed above, those of skill in the art will appreciate that a codeword may comprise a greater or fewer number of symbols than illustrated. Further, the methods, modes, or schemes below are described with respect to the example OFDM symbol having Tone0-Tone9 and SpatialStream0-SpatialStream3 as discussed above. As further discussed above, a transmission symbol may comprise a greater or fewer number of spatial streams and/or tones and, thus, may be used to transmit a greater or fewer number of modulated symbols than illustrated.

In the example matrices 700 and 720 illustrated in FIGS. 7A and 7B, respectively, the symbols of the Codeword are first mapped to all combinations having Tone0. Thus, symbols A-D are mapped to {SpatialStream0, Tone0}, {SpatialStream1, Tone0}, {SpatialStream2, Tone0}, and {SpatialStream3, Tone0}. In some aspects, the symbols A-D are mapped sequentially to the spatial streams as illustrated in FIG. 7A. In other aspects, the symbols A-D are randomly mapped to the spatial streams or are mapped using an order that is not sequential.

After the symbols A-D are mapped, the symbols E-H may be mapped to all combinations having a tone that is separated from Tone0 by at least one tone (i.e., a non-adjacent tone). Thus, the symbols E-H may be mapped to any of Tone2-Tone9. In one aspect, the number of tones to skip may be predetermined, for example to be a distance D, or the number of tones to skip may be any number up to a defined maximum separation. For example, in the matrix 700 illustrated in FIG. 7A, the symbols E-H are mapped to Tone2. Thus, one tone separates the mapping of the symbols A-D and E-H. Symbols I-L and M-N may similarly be mapped to Tone4 and Tone6, respectively. In some aspects, the number of tones to skip may be an integer number between 1 and 9. For example, the integer number may comprise one less than an integer divisor of the number of tones in the range of tones available for transmitting data.

In another aspect, the number of tones to skip may be determined based on the number of symbols $N_{sc}$ that are in a codeword and the number of modulated symbols $N_{st}$ in a transmission symbol, such as an OFDM symbol. For example, two symbols mapped to the same spatial stream may be mapped to tones that differ by the largest integer smaller than or equal to $N_{st}/N_{sc}$, or to tones that differ by the smallest integer larger than or equal to $N_{st}/N_{sc}$. In the matrix 720 illustrated in FIG. 7B, the symbols in the Codeword are mapped to tones that differ by ceil($N_{st}/N_{sc}$)=3. In some aspects, the distance D discussed above is greater than $N_{st}/N_{sc}$.

If symbols of a codeword having an index i are sequentially mapped to combinations of a tone and a spatial stream starting with the first cell in the first row of the matrix 500 illustrated in FIG. 5 according to the aspect described above, then an index of the spatial stream for a symbol may be determined using the following equation:

$$\text{SpatialStream} = i \bmod N_S \quad (1).$$

In such an aspect, an index of the tone for the symbol may be determined using $$\text{Tone} = \text{floor}(i/N_S) \times \text{floor}(N_{st}/N_{sc}) \quad (2)$$

or using $$\text{Tone} = \text{floor}(i/N_S) \times \text{ceil}(N_{st}/N_{sc}) \quad (3).$$

In some aspects, an index of the tone for the symbol may be determined using $$\text{Tone} = \text{floor}(i/N_S) \times D \quad (4),$$

where D is a tone mapping distance as discussed above. In some aspects, D may be floor($N_{st}/N_{sc}$), ceil($N_{st}/N_{sc}$), or a number that is constant for a plurality of distinct values of $N_{st}$. For example, in some aspects, D is an integer that is equal to or greater than 2 and less than or equal to 10. As a further example, D may be a divisor of the number of tones in the range of tones available for transmitting data. Of course, symbols in a codeword need not be mapped starting with the first cell in the first row of a matrix. The symbols of a codeword may be mapped starting anywhere in the matrix. For example, a first symbol of a codeword that is mapped after the Codeword illustrated in FIG. 7A may be mapped to {SpatialStream2, Tone6}.

Figures 8A, 8B:
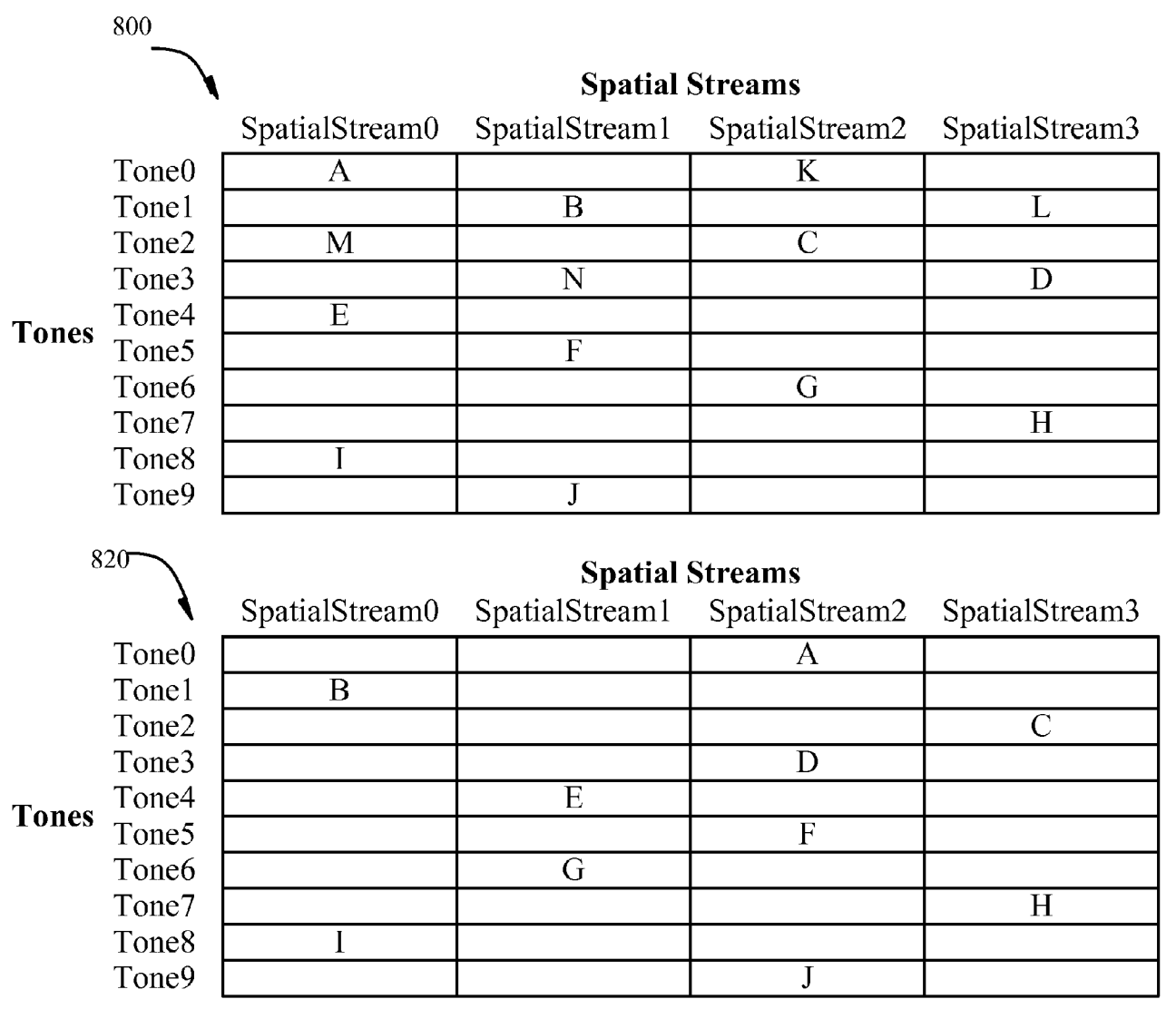

In the example matrices 800 and 820 illustrated in FIGS. 8A and 8B, respectively, each symbol in the Codeword is mapped to a different tone and spatial stream than the symbol preceding it. For example, each symbol may be mapped to a tone adjacent the tone that the preceding symbol is mapped to, and to any spatial stream other than the spatial stream to which the preceding symbol is mapped.

In the matrix 800 illustrated in FIG. 8A, Symbol A is first mapped to {SpatialStream0, Tone0}. Symbol B is then mapped to {SpatialStream0, Tone0}. Subsequent spatial streams are sequentially mapped to an adjacent tone and an adjacent spatial stream. When an edge of the matrix is reached, the mapping "wraps around" to the opposite side. Thus, the mapping of symbol E wraps around to SpatialStream0, and the mapping of symbol K wraps around to Tone0.

In FIG. 8A, the subset of symbols A-J are mapped approximately uniformly over the range of Tone0-Tone9 and over the range of SpatialStream0-SpatialStream3. After this subset of symbols is mapped, the remainder of symbols in the Code-word may be filled in, for example, at random or according to the mapping scheme used for symbols in the subset.

If symbols of a codeword having an index i are sequentially mapped to combinations of a tone and a spatial stream starting with the first cell in the first row of the matrix illustrated in FIG. 5 according to the aspect described above, then an index of the spatial stream for a symbol may be determined using the following equation:

$$\text{SpatialStream} = i \bmod N_S \quad (5).$$

In such an aspect, an index of the tone for the symbol may be determined using $$\text{Tone} = i \quad (6)$$

for all values of less than $N_{tones}$. For symbols having an index i equal to or greater than $N_{tones}$, an index of the tone for those symbols may be determined using $$\text{Tone} = N_{tones} \bmod N_S \quad (7)$$

for values of $N_{tones}$ that are not evenly divisible by $N_S$, and using $$\text{Tone} = N_{tones} \bmod N_S + 1 \quad (8)$$

for values of $N_{tones}$ that are evenly divisible by $N_S$. In some aspects, this mapping may be implemented using a cyclic shift. Of course, symbols in a codeword need not be mapped starting with the first cell in the first row of a matrix. The symbols of a codeword may be mapped starting anywhere in the matrix.

In the matrix 820 illustrated in FIG. 8B, the symbol A is mapped to Tone0 and to a random spatial stream. The following symbol B is mapped to Tone1 and to a random spatial stream other than the spatial stream that A is mapped to. Similarly, the symbol C is mapped to Tone2 and to a random spatial stream other than the spatial stream that B is mapped to. In the example matrix 820, only symbols A-J are illustrated. Those of skill in the art will appreciate that symbols K-N may similarly be mapped in this way.

In the example matrices 900 and 920 illustrated in FIGS. 9A and 9B, respectively, the symbols of the Codeword are first mapped to all combinations having SpatialStream0. Each consecutive symbol, however, is mapped to a combination having a tone that is separated from a tone of the previous symbol by at least one. In one aspect, the number of tones to skip may be predetermined, for example to be a distance D, or the number of tones to skip may be any number up to a defined maximum separation. For example, symbols A-E may be mapped to {SpatialStream0, Tone0}, {SpatialStream0, Tone2}, {SpatialStream0, Tone4}, {SpatialStream0, Tone6}, and {SpatialStream0, Tone8}, respectively. In some aspects, the number of tones to skip may be an integer number between 1 and 9. For example, the integer number may comprise one less than an integer divisor of the number of tones in the range of tones available for transmitting data.

In another aspect, the number of tones to skip may be determined based on the number of symbols $N_{sc}$ that are in a codeword and the number of modulated symbols $N_{st}$ in a transmission symbol, such as an OFDM symbol. For example, two symbols mapped to the same spatial stream may be mapped to tones that differ by the largest integer smaller than or equal to $N_{st}/N_{sc}$, or to tones that differ by the smallest integer larger than or equal to $N_{st}/N_{sc}$. In the matrices 900 and 920 illustrated in FIGS. 9A and 9B, the symbols in the codeword are mapped to tones that differ by ceil($N_{st}/N_{sc}$)=3. In some aspects, the distance D discussed above is greater than $N_{st}/N_{sc}$.

In some aspects, when certain symbols of the Codeword have been mapped approximately uniformly to combinations over the range of tones associated with one spatial stream, the next symbol is mapped to a combination comprising Tone0 and the adjacent spatial stream. Thus, in the matrix 900 illustrated in FIG. 9A, the symbol F is mapped to {Spatial-Stream1, Tone0}.

In other aspects, when certain symbols of the Codeword have been mapped approximately uniformly to combinations over the range of tones associated with one spatial stream, the next symbol is mapped to a combination comprising the adjacent spatial stream and to a tone such that the skipping of tones is maintained when "wrapping around" from the bottom of the matrix to the top. Thus, in the matrix 920 illustrated in FIG. 9B, the symbol F is mapped to {SpatialStream1, Tone 2}. This is because Tone0 and Tone1 are skipped based on ceil($N_{st}/N_{sc}$)=3, as described above.

If symbols of a codeword having an index i are sequentially mapped to combinations of a tone and a spatial stream starting with the first cell in the first row of the matrix illustrated in FIG. 5 according to the aspect described above, then an index of the spatial stream (i.e., the spatial stream index) for a symbol may be determined using the following equation:

$$\text{SpatialStream} = \text{floor}(i/N_{tones}) \quad (9)$$

In such an aspect, an index of the tone (i.e., the tone index) for the symbol may be determined using $$\text{Tone} = \text{floor}(N_{st}/N_{sc}) \times i \bmod N_{tones} \quad (10)$$

or using $$\text{Tone} = \text{ceil}(N_{st}/N_{sc}) \times i \bmod N_{tones} \quad (11).$$

Of course, symbols in a codeword need not be mapped starting with the first cell in the first row of a matrix. The symbols of a codeword may be mapped starting anywhere in the matrix. In aspects where only one spatial stream is used for transmission, the mapping aspect described above may be used to map modulated symbols of a codeword to tones for transmission. In such aspects, the range of spatial streams would be one, and the symbols of that codeword would be distributed among the range of tones for that range of one spatial stream.

Aspects described above illustrate mapping of modulated symbols associated with a codeword. Those of skill in the art will appreciate, however that the aspects described above may be used to map symbols associated with a plurality of codewords to a single OFDM symbol. For example, modulated symbols from a plurality of codewords may be transmitted in a single OFDM symbol. Before transmission of the OFDM symbol, modulated symbols are mapped to each combination of a tone and a spatial stream in the OFDM symbol. If during the mapping there are no symbols of a given codeword left to map, then symbols from a following codeword are mapped. This process continues until a modulated symbol has been mapped to each combination. In some aspects, each symbol is mapped according to one of the aspects described above. In another aspect, symbols from a first codeword are mapped according to one of the aspects described above, while symbols from a following codeword are mapped using a different scheme or aspect. In some aspects, the modulated symbols associated with a codeword may be split among two or more OFDM symbols. For example, modulated symbols associated with the codeword may be mapped to the OFDM symbol until modulated symbols have been mapped to all combinations in the OFDM symbol. Thereafter, any modulated symbols in the codeword that have not been mapped will be mapped to the next OFDM symbol.

FIG. 10A illustrates an aspect in which modulated symbols associated with a plurality of codewords are mapped to one OFDM symbol. In the illustrated aspect, the OFDM symbol comprises Tone0-Tone7, and SpatialStream0-SpatialStream3. Also in the illustrated aspect, symbols associated with three codewords are represented. Symbols from a first codeword are represented with a "1," symbols from a second codeword are represented with a "2," and symbols from a third codeword are represented with a "3." In the illustrated aspect, each of the codewords is associated with 12 symbols. Only eight of the symbols corresponding to the third codeword, however, could be mapped to the illustrated OFDM symbol. The remaining four symbols corresponding to the third codeword may be mapped to a subsequent OFDM symbol.

As can be seen in FIG. 10A, the symbols corresponding to each of the three codewords are mapped to interleaved tones for transmission. In this way, entire physical tones for transmission of the symbols of each of the codewords may be permuted with respect to the logical tones of the symbols. In one aspect, the permutation may be performed by an IFFT module configured to output tones in an arbitrary or permuted order. In some aspects, this permutation is performed with no increase or a negligible increase in latency.

FIG. 10B illustrates another aspect in which modulated symbols associated with a plurality of codewords are mapped to one OFDM symbol. In the illustrated aspect, symbols from a first codeword, a second codeword, and a third codeword are again mapped to an OFDM symbol and are represented by "1," "2," and "3," similar to FIG. 10A. In FIG. 10B, however, the OFDM symbol is illustrated as being the same as the OFDM symbol in FIG. 7B. Further, the symbols associated with the first symbol are mapped to the OFDM symbol in a manner similar to the symbols A-N illustrated in FIG. 7B. FIG. 10B, however, illustrates that the second and third symbols may be similarly mapped to the OFDM symbol, for example starting at a cell in the matrix following a location where the last symbol N of the first codeword was mapped.

In the illustrated aspect, the last symbol of the first codeword may be mapped to {SpatialStream1, Tone9}. The first symbol of the second codeword may therefore be mapped to {SpatialStream2, Tone9}. After mapping of the second symbol in the second codeword at {SpatialStream3, Tone9}, mapping of symbols in the second codeword may "wrap around" such that the third symbol in the second codeword is mapped to {SpatialStream0, Tone 2}. In some aspects, the third symbol may instead by mapped to {SpatialStream0, Tone 1}. In the illustrated aspect, the last symbol of the second codeword is mapped to {SpatialStream3, Tone8}. Accordingly, the first symbol of the third codeword may be mapped to {Spatial Stream0, Tone1}, and the twelfth symbol of the third codeword may be mapped to {SpatialStream3, Tone7}. In the illustrated aspect, the thirteenth and fourteenth symbols of the third codeword may be mapped to a following OFDM symbol.

Although aspects are described above using terms such as "first" and "next," the mapping of symbols is not limited to any order that may be implied by the above description. Those of skill in the art will recognize that symbols may be mapped in any order.

As discussed above, mapping of symbols according to aspects discussed above may be performed by writing bits of the symbols to a table or matrix representing an OFDM symbol, and then reading the symbols from that table or matrix. As also discussed above, the symbols are not actually written into cells of a matrix in some aspects, but may still be mapped to a combination of a tone and a spatial stream. For example, a symbol may be mapped to a tone and a spatial stream according to an aspect discussed above by using a lookup function or by deriving the values mathematically using an index. Further, other methods or means of mapping modulation symbols may be used to interleave or permute the modulation symbols or the tones used to transmit such modulation symbols.

Figure 11:
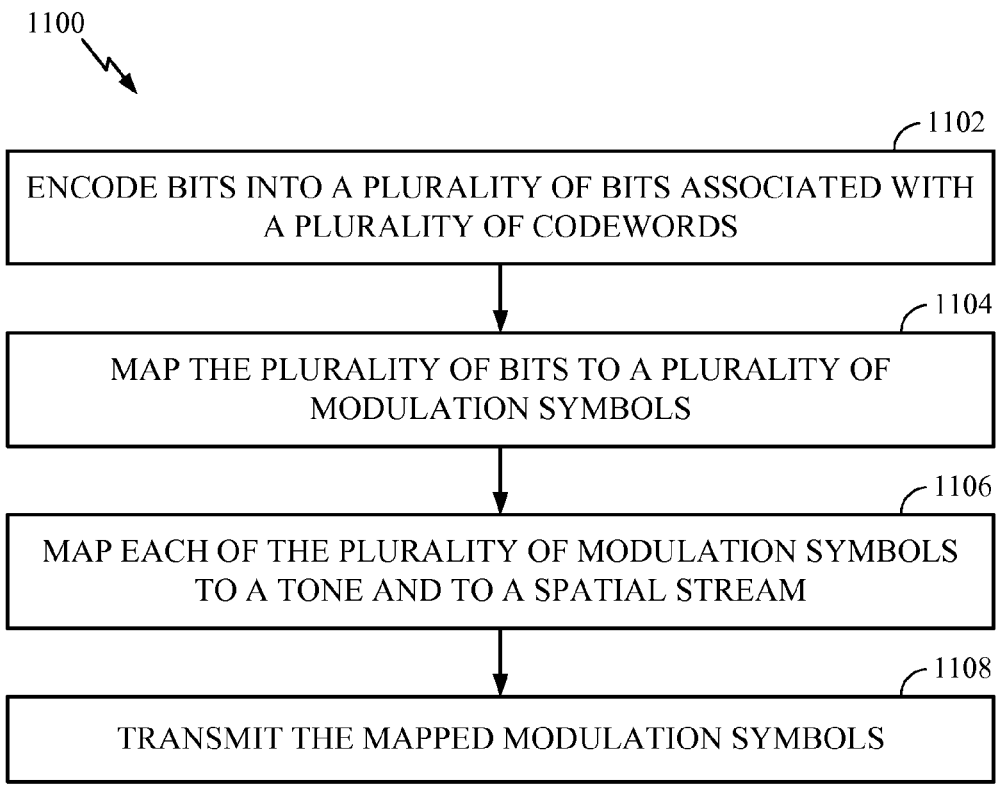
FIG. 11 illustrates example operations for mapping each of a plurality of modulation symbols to a tone and a spatial stream, in accordance with certain aspects of the present disclosure.

FIG. 11 illustrates example operations 1100 for mapping each of a plurality of modulation symbols to a tone and a spatial stream. The operations 1100 may be used to transmit information from a wireless node (e.g., wireless node 400). In some aspects, operations 1100 are used to transmit information from an AP 110 to a user terminal 120, or from an access terminal to an AP. Although the operations below will be described with respect to elements of the wireless node 400, those of skill in the art will appreciate that other components may be used to implement one or more of the operations described herein.

At 1102, bits are encoded into a plurality of bits associated with a plurality of codewords. The bits that are encoded at 1102 may represent data or information to be transmitted. As discussed above, encoding the bits may comprise using a FEC code such as an LDPC code or other block code. In some aspects, encoding the bits comprises adding additional bits such that the number of bits in the plurality of bits is greater than the number of the bits prior to encoding. The encoding may be performed by the encoder 402, for example.

After the encoding, the plurality of bits are mapped to a plurality of modulation symbols at 1104. The mapping may be performed by the modulator 404, for example. As discussed above, the modulator 404 may comprise a 64-QAM mapper configured to perform the mapping.

Subsequently, at 1106, each of the plurality of modulation symbols are mapped to a tone and a spatial stream. As discussed above, the tone for each of the modulation symbols may be any tone in a range of tones, and the spatial stream may be any spatial stream in a range of spatial streams. In some aspects, all possible combinations of tones in the range of tones and spatial streams in the range of spatial streams may correspond to an OFDM symbol.

In some aspects, some of the modulation symbols are approximately uniformly mapped to the spatial streams in the range of spatial streams. These modulation symbols may correspond to consecutive bits associated with one of the plurality of codewords. Further, when these modulation symbols are mapped to a common spatial stream, they may be mapped to non-adjacent tones. Thus, at 1106, the modulation symbols may be mapped such that physical tones are permuted with respect to logical tones.

As discussed above, modulation symbols may be mapped to all combinations having a first tone. Additional modulation symbols may be mapped to all combinations having a second tone that is not adjacent the first tone. For example, the second tone may be separated from the first tone by a predetermined number of tones, or a separation of the first and second tone may be determined based on the number of all possible combinations and the number of symbols associated with a codeword. Additional symbols may be mapped to all combinations having a third tone that is not adjacent the second tone.

As also discussed above, after a modulation symbol is mapped to a combination of a first tone and a first spatial stream, the next modulation symbol may be mapped to a combination of a second tone distinct from the first tone and a second spatial stream distinct from the first spatial stream. In some aspects, the second tone is adjacent the first tone and the second spatial stream is adjacent the first spatial stream. This mapping may continue for all symbols associated with a codeword or for a subset of symbols associated with the codeword, and may wrap around when a maximum tone or spatial stream is reached.

As further described above, symbols of a codeword may be mapped approximately uniformly to tones that are combined with a common spatial stream. These symbols may be mapped to tones that are separated by a predetermined number of tones, or by a number of tones determined based on the number of all possible combinations and the number of symbols associated with a codeword. For example, after a modulation symbol is mapped to a combination of a first tone and a first spatial stream, the next modulation symbol may be mapped to a combination of a second tone separate from the first tone by at least one other tone and the first spatial stream. Symbols may be similarly mapped to combinations of tones and other spatial streams.

For certain aspects, the modulation symbols of the subset may be mapped to a matrix correlating the plurality of tones to the plurality of spatial streams. The $i^{th}$ modulation symbol in the subset may be mapped to a spatial stream having a spatial stream index of i mod $N_S$ and to a tone having a tone index of i or floor($i/N_S$)×D, where $N_S$ is a number of spatial streams in the plurality of spatial streams and D is a tone mapping distance. The tone mapping distance D may comprise one of floor($N_{st}/N_{sc}$), ceil($N_{st}/N_{sc}$), or a number that is constant for a plurality of distinct values of $N_{st}$, where $N_{st}$ is a number of the modulation symbols in a transmission symbol and where $N_{sc}$ is a number of the modulation symbols in the one of the plurality of codewords. For certain aspects, the modulation symbols that correspond to the one of the plurality of codewords and are not in the subset may be mapped to the matrix, wherein the $k^{th}$ modulation symbol is mapped to a tone having a tone index of k and to a spatial stream having a spatial stream index of max(i) mod $N_S$ if max(i) is not divisible by $N_S$ or max(i) mod $N_S$+1 if max(i) is divisible by $N_S$.

For other aspects, the modulation symbols of the subset may be mapped to a matrix correlating the plurality of tones to the plurality of spatial streams. The $i^{th}$ modulation symbol in the subset may be mapped to a spatial stream having a spatial stream index of floor($i/N_{tones}$) and to a tone having a tone index of floor($N_{st}/N_{sc}$)×i mod $N_{tones}$ or ceil($N_{st}/N_{sc}$)×i mod $N_{tones}$, where $N_{tones}$ is a number of tones in the plurality of tones, where $N_{st}$ is a number of the modulation symbols in a transmission symbol, and where $N_{sc}$ is a number of the modulation symbols in the one of the plurality of codewords.

For certain aspects, mapping each of the plurality of modulation symbols comprises mapping a first modulation symbol in the subset to a first tone and a first spatial stream, mapping a second modulation symbol of the subset to the first tone and a second spatial stream and mapping a third modulation symbol of the subset to a second tone and a third spatial stream, wherein the first and second tones are not adjacent. Bits corresponding to the second modulation symbol may immediately follow bits corresponding to the first modulation symbol in the one of the plurality of codewords, and bits corresponding to the third modulation symbol may immediately follow the bits corresponding to the second modulation symbol in the one of the plurality of codewords.

According to certain aspects, a number of tones between a first tone and a second tone may be approximately equivalent to a number of possible tone-and-spatial-stream combinations (out of the plurality of tones and the plurality of spatial streams) divided by a number of the modulation symbols associated with one of the plurality of codewords.

As described herein, the mapping of modulation symbols (which may include LDPC tone mapping) may be performed on all (LDPC) coded streams, using tone mapping distance parameter D. D may be constant for each bandwidth, and its value for different bandwidths is provided in Table 1 below:

TABLE 1

Tone mapping distance for each bandwidth

| Parameter | 20 MHz | 40 MHz | 80 MHz | 160 MHz, 80 + 80 MHz |
|---|---|---|---|---|
| D | 4 | 6 | 9 | 9 |

The mapping at 1106 may be performed by the symbol mapping module 406. In some aspects, all or a portion of the mapping at 1106 is performed by an IFFT module, which may be implemented in combination with, as a portion of, or separate from the symbol mapping module 406.

At 1108, the mapped modulation symbols are transmitted. In some aspects, each mapped symbol may be transmitted over the tone to which the symbol is mapped, for example using the spatial stream to which the symbol is mapped. In some aspects, each spatial stream corresponds to a separate antenna, and the symbols mapped to each spatial stream are transmitted using a respective antenna. The transmission may be performed by the transmitting module 408. The mapped symbols may be wirelessly transmitted to a node in the system 100, for example.

Figure 12:
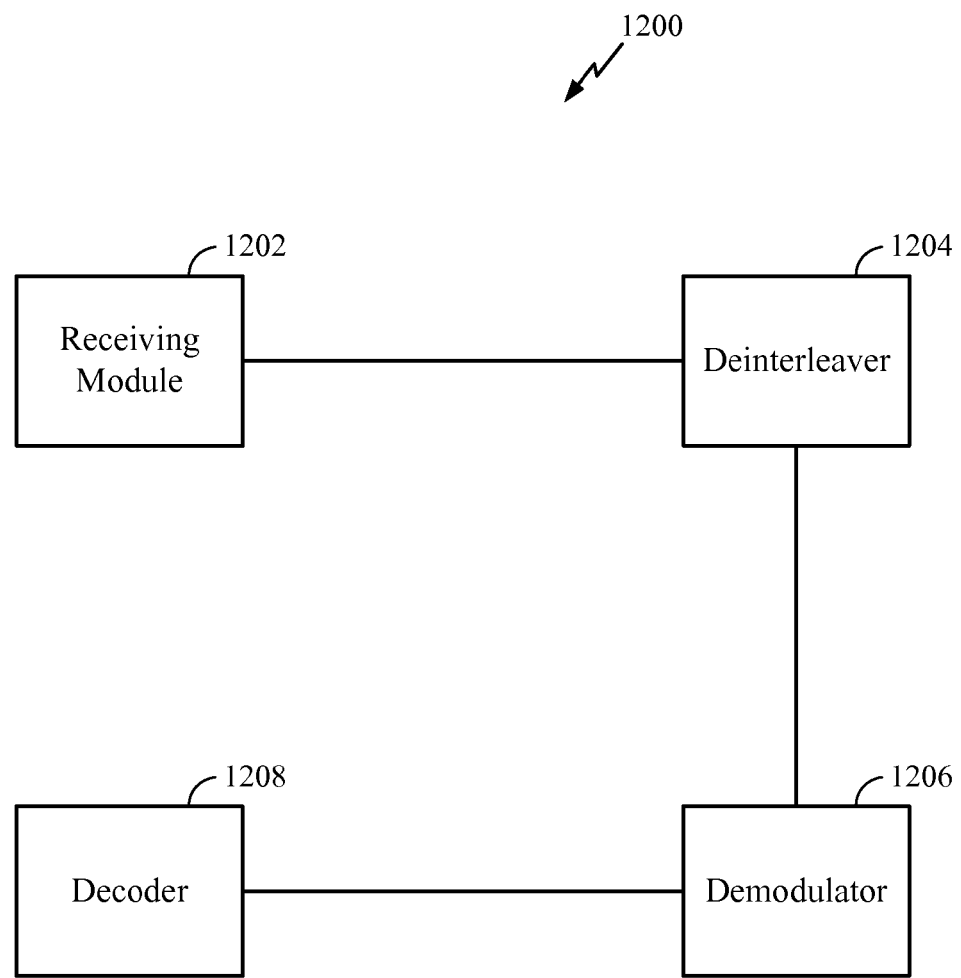
FIG. 12 illustrates a block diagram of an example receiving entity, in accordance with certain aspects of the present disclosure.

FIG. 12 illustrates a block diagram of an example receiving entity, such as a wireless node 1200 for use within the system 100. The wireless node 1200 may be used to receive information, for example as transmitted from the wireless node 400. For example, the wireless node 1200 may be an AP 110 illustrated in FIG. 1 or FIG. 2. In such an aspect, the wireless node 1200 may be used to receive information transmitted with mapped symbols from one of the user terminals 120. Similarly, the wireless node 1200 may be any of the user terminals 120 illustrated in FIG. 1 or FIG. 2. In such an aspect, the wireless node 1200 may be used to receive information transmitted using mapped symbols from the AP 110. The wireless node 1200 may be implemented as described with respect to the wireless device 302 illustrated in FIG. 3.

The wireless node 1200 may comprise a receiving module 1202 for receiving symbols over various tones and spatial streams. The symbols correspond to the mapped symbols transmitted by the wireless node 400. Thus, the symbols have been mapped to tones and spatial streams as described with respect to the aspects above. Therefore, at least a subset of the symbols may be received approximately uniformly over the range of spatial streams available for reception of data. The symbols in this subset may correspond to bits associated with a codeword. In some aspects, an original order of the bits (prior to mapping and transmitting by the wireless node 400) is consecutive. In some aspects, symbols of the subset that are received over a common spatial stream are received over non-adjacent tones in the range of tones. In some aspects, the symbols corresponding to each spatial stream may be received over a respective antenna. In some aspects, an input port or other form of input may be included to receive symbols from the respective antennas.

The receiving module 1202 may be implemented using a receiver (e.g., the receiver 312 illustrated in FIG. 3) or a combination of receivers (e.g., the receivers 222a-222ap, 254m-254mu, or 254xa-254xu illustrated in FIG. 2). The receiving module 1202 may be implemented in a transceiver. In some aspects, functionality of the receiving module 1202 is implemented in other modules and need not be implemented separate from the other modules illustrated in FIG. 12. In some aspects, the receiving module 1202 comprises an antenna and a transceiver, for example the antenna 224 and the transceiver 222, or the antenna 252 and the transceiver 254. Messages may be received via the antenna with the receiving module 1202. In some aspects, messages may be received via a plurality of antennas, as discussed above.

The wireless node 1200 may further comprise a deinterleaver 1204 for arranging the symbols received for at least one codeword into an original order of the codeword. In some aspects, modulated symbols received in an OFDM symbol are written to a table or matrix similar to the matrix 500 illustrated in FIG. 5. After the symbols are stored in the matrix, the symbols may be read from the matrix according to a mapping scheme used by the wireless node 400. In some aspects, the symbols are not actually written into cells of a matrix, but the deinterleaver 1204 is configured to appropriately arrange the symbols using a lookup function or mathematical algorithms, for example. In some aspects, the mapping scheme used by the wireless node 400 is known a priori by the deinterleaver 1204. In other aspects, information indicating the scheme may be received at the receiving module 1202 to notify the deinterleaver 1204 of the appropriate mapping. This information may be transmitted over a control channel or included in a packet with one or more of the symbols, for example.

If the deinterleaver 1204 knows how the symbols were mapped, then the deinterleaver 1204 may arrange the received symbols into full codewords. For example, the deinterleaver 124 may allocate all symbols received over a first tone to a codeword. Similarly, all symbols received over a second tone (or third, etc.) that is not adjacent the first tone may be allocated to the codeword. Thus, symbols mapped as shown in FIGS. 7A and 7B may be arranged into a codeword, as may symbols mapped as shown in FIGS. 10A and 10B. In some aspects, the deinterleaver 1204 may use an inverse of Equations (1)-(4) to determine an appropriate index of a received symbol.

As another example, the deinterleaver 1204 may arrange a symbol received over a first tone and a first spatial stream, and another symbol received over a second tone distinct from the first tone and a second spatial stream distinct from the first spatial stream, into a codeword. Thus, symbols mapped as shown in FIGS. 8A and 8B may be arranged into a codeword. If the deinterleaver 1204 knows the criteria used to map each symbol, then the deinterleaver may arrange received symbols into the codeword. In some aspects, the deinterleaver 1204 may use an inverse of Equations (5)-(8) to determine an appropriate index of a received symbol.

As a further example, the deinterleaver 1204 may arrange symbols that are received over a common spatial stream and that are received over tones separated by a predetermined number of tones into a codeword. Thus, symbols mapped as shown in FIGS. 9A and 9B may be arranged into a codeword. In some aspects, the deinterleaver 1204 may use an inverse of Equations (9)-(11) to determine an appropriate index of a received symbol.

The deinterleaver 1204 thus may be configured to arrange symbols associated with a codeword and received over a permuted set of physical tones into an original configuration of logical tones for that codeword. In some aspects, the symbols for a codeword are received over two or more OFDM symbols. In some aspects, the deinterleaver 1204 may be implemented using the RX data processor 270 or 242, or the controller 230 or 280, illustrated in FIG. 2. Further, the deinterleaver 1204 may be implemented using the processor 304 or the DSP 320 illustrated in FIG. 3. In some aspects, a fast Fourier transform (FFT) module is used to implement the deinterleaver 1204 or a portion thereof. As discussed above, mapping of symbols pursuant to the aspects described above may reduce latency. In this way, the latency of processing at the wireless node 1200 may be reduced, for example at the deinterleaver 1204.

The wireless node 1200 may also comprise a demodulator 1206 for demodulating symbols into bits associated with a plurality of codewords. After the symbols are properly arranged by the deinterleaver 1204 to an original order of a codeword, the symbols may be demodulated into the bits associated with that codeword. The demodulator 1206 may, for example, reverse a mapping of bits to a symbol in a constellation. In some aspects, the demodulator comprises a 64-QAM demodulator. The 64-QAM demodulator may determine six bits of the codeword from every received symbol associated with the codeword. In some aspects, the demodulator 1206 may be implemented using the RX data processor 270 or 242, or the controller 230 or 280, illustrated in FIG. 2. Further, the demodulator 1206 may be implemented using the processor 304 or the DSP 320 illustrated in FIG. 3.

The wireless node 1200 may additionally comprise a decoder 1208 for decoding the bits from the demodulator 1206. In one aspect, the decoder 1208 receives bits associated with codewords and outputs a stream of bits representative of data transmitted by the wireless node 400. For example, codewords may be decoded using a block code, such as a form of a FEC code that was used to encode the codewords. In some aspects, the decoder 1208 is configured to decode bits using an LDPC code, a Reed-Solomon code, or any of other various suitable block codes. In some aspects, decoding bits associated with codewords comprises removing certain bits.

In some aspects, the decoder 1208 is configured to perform iterative decoding, for example LDPC iterative decoding. In one aspect, time used to perform the iterative decoding may be offset by a reduced latency during the processing of received symbols, for example as discussed above. Thus, total processing time of received information may be held constant, or in some aspects may be reduced, when using a mapping of symbols described above. In some aspects, the decoder 1208 may be implemented using the RX data processor 270 or 242, or the controller 230 or 280, illustrated in FIG. 2. Further, the decoder 1208 may be implemented using the processor 304 or the DSP 320 illustrated in FIG. 3.

Figure 13:
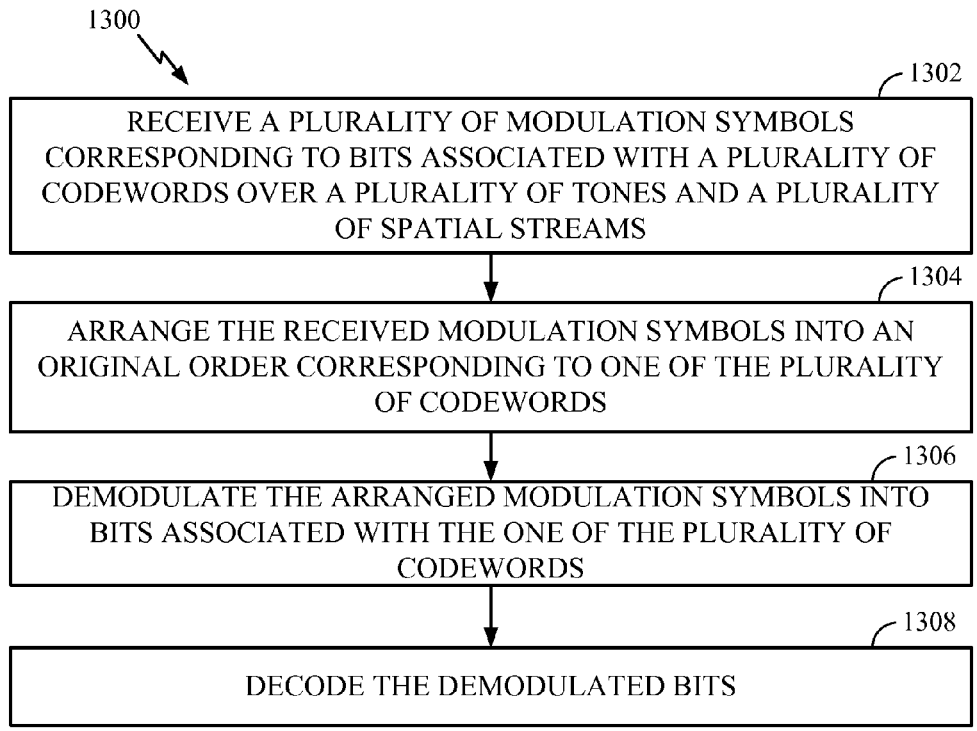
FIG. 13 illustrates example operations for receiving a plurality of modulation symbols over a plurality of tones and spatial streams and interpreting the received symbols to determine the bits of the original message, in accordance with certain aspects of the present disclosure.
Figure 13A:
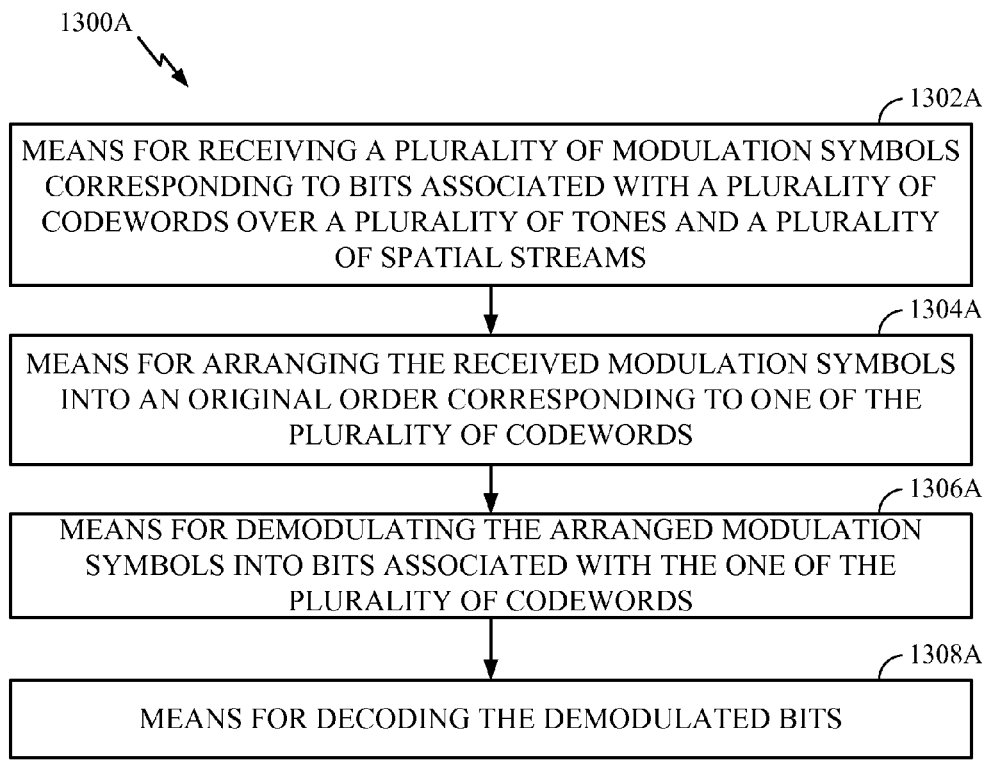
FIG. 13A illustrates example means for performing the operations shown in FIG. 13.

FIG. 13 illustrates example operations 1300 for receiving a plurality of modulation symbols over a plurality of tones and spatial streams and interpreting the received symbols to determine the bits of the original message. The operations 1300 may be used to receive information from a wireless node, for example the wireless node 400. A wireless node (e.g., wireless node 1200) may be used to perform the reception. In some aspects, the operations 1300 are used to receive information from an AP 110 or from a user terminal 120. Although the operations below will be described with respect to elements of the wireless node 1200, those of skill in the art will appreciate that other components may be used to implement one or more of the operations described herein.

At 1302, a plurality of modulation symbols are received over a plurality of tones and a plurality of spatial streams. The modulation symbols may correspond to bits associated with a plurality of codewords. A subset of the plurality of modulation symbols may correspond to consecutive bits associated with one of the plurality of codewords, and the subset of modulation symbols may be approximately uniformly distributed over the plurality of spatial streams. In some aspects, the modulation symbols of the subset that are received over a common spatial stream (i.e., in the same spatial stream) are distributed over non-adjacent tones in the plurality of tones. The reception at 1302 may be performed by the receiving module 1202, for example.

At 1304, the subset of the received modulation symbols is arranged into an original order corresponding to one of the plurality of codewords. For example, as described above with respect to the deinterleaver 1204, modulation symbols may be properly arranged based on information indicating the scheme used to map the modulation symbols. The information may be known a priori or received. In some aspects, functions corresponding to an inverse of any of Equations (1)-(11) may be used to determine an index of a symbol. In some aspects, received modulation symbols are written to and read from a table or matrix. In other aspects, a position of a modulation symbol is looked up or mathematically determined, for example. The arrangement may be performed by the deinterleaver 1204. In some aspects, an FFT is configured to arrange physical tones that have been permuted for symbols of a codeword into logical tones for the codeword. For example, the arranging at 1304 may comprise permuting physical tones over which the plurality of modulation symbols are received in an effort to arrange the plurality of modulation symbols into a plurality of logical tones.

After the modulation symbols are arranged at 1304, the modulation symbols associated with the codeword are demodulated at 1306. The demodulation may reverse a mapping of bits to modulation symbols. Thus, a plurality of bits may be identified at 1306. The demodulation may be performed by the demodulator 1206, for example.

At 1308, the demodulated bits are decoded. For example, the demodulated bits may be decoded with a block code, such as an LDPC code, a Reed-Solomon code, or any of various other suitable block codes. The demodulation may determine a stream of bits representative of transmitted data based on the plurality of bits associated with a codeword. The decoding at 1308 may be performed by the decoder 1208.

Figure 14:
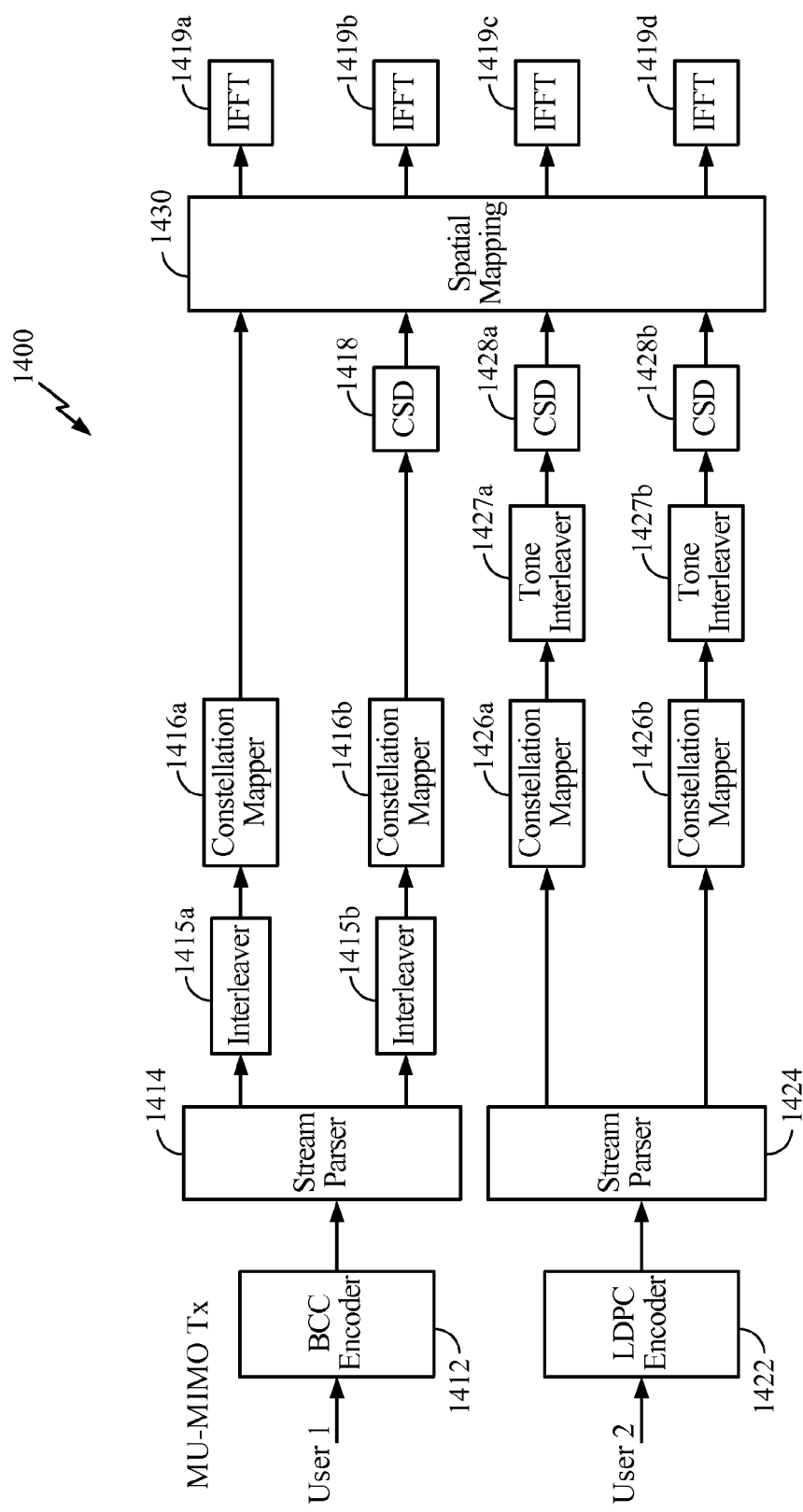
FIG. 14 illustrates a block diagram of an example transmitting entity, in accordance with certain aspects of the present disclosure.

FIG. 14 illustrates an aspect of a wireless node 1400 for use within the system 100. The wireless node 1400 may be used to transmit information. For example, the wireless node 1400 may be the AP 110 illustrated in FIG. 1 or FIG. 2. In such aspect, the wireless node 1400 may be used to transmit information to one of the user terminals 120. Similarly, the wireless node 1400 may be any of the user terminals 120 illustrated in FIG. 1 or FIG. 2. In such aspect, the wireless node 1400 may be used to transmit information to the AP 110. The wireless node 1400 may be implemented as described with respect to the wireless device 302 illustrated in FIG. 3.

In the aspect illustrated in FIG. 14, the wireless node 1400 is illustrated as an access point configured to transmit data to two users. The wireless node 1400, however, may transmit data to only one user or may be configured to transmit data to more than two users.

The wireless node 1400 may comprise an encoder 1412 for encoding a stream of bits. The bits may represent data or information for transmission to a first user or apparatus, as shown in FIG. 14. For example, the bits may be received from the data source 208 or the data source 286 illustrated in FIG. 2. In some aspects, the encoder 1412 encodes the stream of bits using an error correction code such as a FEC code, for example, to increase the robustness of communications transmitted from the wireless node 1400. In the aspect illustrated in FIG. 14, the encoder 1412 comprises a BCC encoder configured to encode bits using binary convolutional code (BCC). A BCC encoder may be used to encode data for transmission to legacy access terminals, for example that cannot receive information encoded with a block code, or may be used according to selected modes of transmission or for transmission of certain types of data. The encoder 1412 may be implemented using the TX data processor 210 or 288, or the controller 230 or 280, illustrated in FIG. 2. Further, the encoder 1412 may be implemented using the processor 304 or the DSP 320 illustrated in FIG. 3.

The wireless node 1400 may further comprise a stream parser 1414 for separating encoded bits for a user into separate streams. For example, each stream may correspond to a respective application or process running on an access terminal of the user. In the illustrated aspect, the stream parser 1414 splits the encoded bits into two separate streams. In some aspects, the stream parser 1414 is omitted, and a single stream of bits is passed to an interleaver 1415. In other aspects, the stream parser 1414 determines that only one stream will be sent to the user. In some aspects, the stream parser 1414 may split the encoded bits into more than two streams. In some aspects, up to eight streams may be concurrently processed at the wireless node 1400. The streams parsed by the stream parser 1414 may be referred to as logical spatial streams in some aspects. The stream parser 1414 may be implemented using the TX data processor 210 or 288, or the controller 230 or 280, illustrated in FIG. 2. Further, the stream parser 1414 may be implemented using the processor 304 or the DSP 320 illustrated in FIG. 3.

The interleaver 1415 is configured to interleave bits encoded by the encoder 1412. In some aspects, interleavers 1415*a* and 1415*b* each receive and interleave respective streams of encoded bits from the stream parser 1414. The interleaver 1415 may rearrange the encoded bits such that they are output in a different order than received from the encoder 1412 or stream parser 1414. The interleaver 1415 may be implemented using the TX data processor 210 or 288, or the controller 230 or 280, illustrated in FIG. 2. Further, the interleaver 1415 may be implemented using the processor 304 or the DSP 320 illustrated in FIG. 3.

The wireless node 1400 may further comprise a constellation mapper 1416 for mapping the interleaved bits to a plurality of symbols according to a constellation. In some aspects, constellation mappers 1416*a* and 1416*b* each receive and map respective streams of interleaved bits from the interleavers 1415*a* and 1415*b*. Each mapped symbol may be associated with a logical tone. In some aspects, the constellation mapper 1416 is configured similar to or implemented using the modulator 404 described above with respect to FIG. 4.

The wireless node 1400 may additionally comprise a spatial mapping module 1430 for mapping each symbol in the streams processed at the wireless node 1400 to a physical spatial stream. For example, the spatial mapping module 1430 may receive all symbols that are mapped to a given tone for transmission, and may then spread these symbols among a plurality of antennas for transmission. In one aspect, each stream that is processed by the wireless node 1400 yields one symbol per tone in an OFDM symbol. The spatial mapping module 1430 may receive a symbol from each stream for each tone and may assign all symbols having a common tone to respective antennas for transmission. In some aspects, there are at least as many antennas as there are streams. In the illustrated aspect, symbols in a sequence of symbols output by the constellation mapper 1416 are transmitted over sequential tones. Thus, the physical tones used to transmit the symbols output by the constellation mapper 1416 may correspond to or be substantially the same as the logical tones associated with each of these symbols. In some aspects, the symbol mapping module 406 described above with respect to FIG. 4 is used to implement the spatial mapping module 1430 or a portion thereof. The spatial mapping module 1430 may be implemented using the TX data processor 210 or 288, or the controller 230 or 280, illustrated in FIG. 2. Further, the spatial mapping module 1430 may be implemented using the processor 304 or the DSP 320 illustrated in FIG. 3.

The wireless node 1400 may also comprise an IFFT module 1419 for converting modulation symbols into a signal in a frequency domain, for example for transmission over a tone in an OFDM symbol. In some aspects, there are as many IFFT modules 1419 as there are antennas in the wireless node 1400. In the aspect illustrated in FIG. 14, there are four IFFT modules 1419*a*-1419*d* to match the number of streams processed at the wireless node 1400. In some aspects, the IFFT module 1419 may implement a portion or all of the spatial mapping module 1430. The IFFT module 1419 may be implemented using the TX data processor 210 or 288, or the controller 230 or 280, illustrated in FIG. 2. Further, the IFFT module 1419 may be implemented using the processor 304 or the DSP 320 illustrated in FIG. 3. In some aspects, the IFFT module 1419 is implemented using the transmitting module 408 illustrated in FIG. 4.

In some aspects, the wireless node 1400 further comprises a cyclic shift diversity (CSD) module 1418 for shifting a stream of symbols by a delay with respect to other symbol streams. This may introduce additional diversity in the transmission of the streams of symbols. In some aspects, each stream of symbols except for a first stream is shifted by a CSD module. In this way, each stream may be offset by a respective amount with respect to the first stream. For example, the aspect illustrated in FIG. 14 shows three CSD modules 1418, 1428*a*, and 1428*b*. In some aspects, another module for shifting a stream of symbols by a delay is included in the wireless node 1400 instead of or in addition to the CSD module 1418. The CSD module 1418 may be implemented using the TX data processor 210 or 288, or the controller 230 or 280, illustrated in FIG. 2. Further, the CSD module 1418 may be implemented using the processor 304 or the DSP 320 illustrated in FIG. 3.

The wireless node 1400 may comprise another encoder 1422 for encoding a stream of bits into a plurality of codewords. The bits may represent data or information for transmission to a second user or apparatus, as shown in FIG. 14. In some aspects, the encoder 1422 encodes the stream of bits using an error correction code such as a FEC code. In the aspect illustrated in FIG. 14, the encoder 1422 comprises an LDPC encoder configured to encode bits using an LDPC code. In some aspects, the encoder 1422 is configured similar to or implemented using the encoder 402 described above with respect to FIG. 4.

The wireless node 1400 may further comprise a stream parser 1424 for separating encoded bits associated with each of the codewords into separate streams. In the illustrated aspect, the stream parser 1424 splits the encoded bits into two separate streams. In some aspects, the stream parser 1424 is omitted. In other aspects, the stream parser 1424 determines that only one stream will be sent to the user. In some aspects, the stream parser 1424 may split the encoded bits into more than two streams. In some aspects, the up to eight streams may be concurrently processed at the wireless node 1400. The streams parsed by the stream parser 1424 may be referred to as logical spatial streams in some aspects. The stream parser 1424 may otherwise be configured similar to the stream parser 1414. In some aspects, a common stream parser may perform the functions of both stream parsers 1414 and 1424.

The wireless node 1400 may also comprise a constellation mapper 1426*b* mapping bits associated with a codeword in a stream to a plurality of symbols according to a constellation.

In some aspects, constellation mappers 1426a and 1426b each receive and map bits associated with codewords in respective streams from the stream parser 1424. Each mapped symbol may be associated with a logical tone. In some aspects, the constellation mapper 1426 is configured similar to or implemented using the modulator 404 described above with respect to FIG. 4.

The wireless node 1400 may also comprise a tone interleaver 1427 for interleaving physical tones of the symbols from the constellation mapper 1426. While the modulation symbols in streams associated with the BCC encoder may be sequentially associated with tones in an OFDM symbol, entire physical tones for transmission of the symbols in streams associated with the LDPC encoder may be permuted with respect to the logical tones of these symbols, as discussed above with respect to FIG. 10, for example. This interleaving or permutation of the tones may be performed after modulation or symbol mapping by the constellation mapper 1426, but prior to shifting by the CSD module 1428. In some aspects, tone interleavers 1427a and 1427b each receive symbols associated with codewords in respective streams and interleave the tones that will be used to transmit those symbols. In some aspects, the tone interleaver 1427 is configured similar to or implemented using the symbol mapping module 406 described above with respect to FIG. 4.

The CSD module 1428 shifts symbols associated with or mapped to interleaved tones by a delay with respect to other symbol streams, for example with respect to a first stream. In some aspects, the CSD modules 1428a and 1428b each receive symbols associated with codewords in respective streams and shift the symbols by a respective delay. The CSD module 1428 may be configured similar to the CSD module 1418. In some aspects, the IFFT module 1419 may implement a portion or all of each of the tone interleaver 1427, CSD module 1418, CSD module 1428, and spatial mapping module 1430.

Some of the modules illustrated in FIG. 14 are labeled with a reference numeral having an "a" or a "b" suffix. In some aspects, a single module instead of both an "a" and a "b" module is implemented in the wireless node 1400. In other aspects, additional modules are implemented. For example, a module for each spatial stream may be implemented. When there are more than two spatial streams for any user, modules in addition to an "a" and a "b" module may be included. Further, some of the modules illustrated in FIG. 14 are labeled with similar names. These modules may be implemented for each user and/or stream, as shown, or there may be fewer modules than illustrated. In some aspects, one or more modules labeled with a similar name are combined into a common module, for example a common module with variable parameters or a common module configured to accept bits of different formats.

Figure 15:
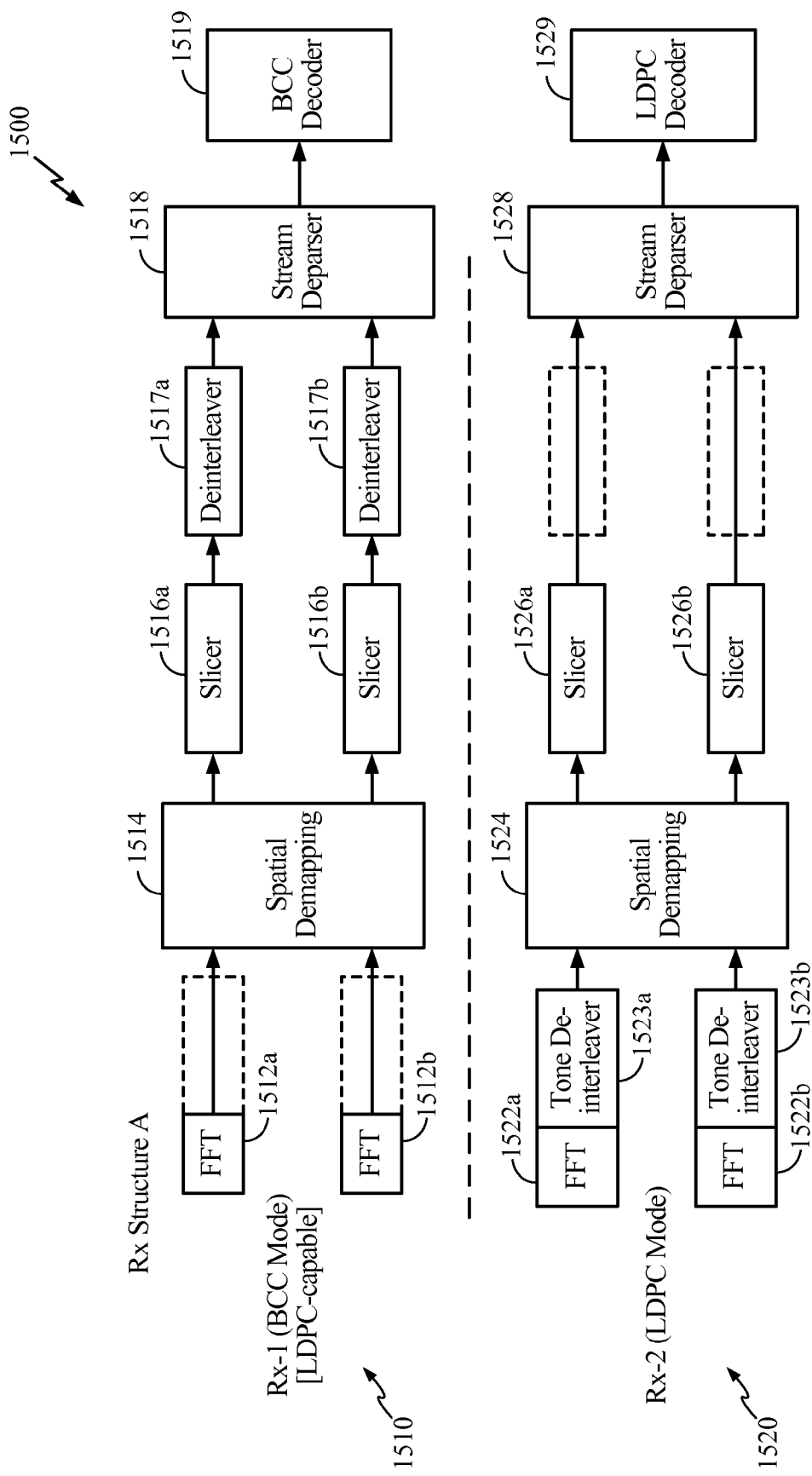
FIGS. 15 and 16 illustrate block diagrams of example receiving entities, in accordance with certain aspects of the present disclosure.

FIG. 15 illustrates an aspect of a wireless node 1500 for use within the system 100. The wireless node 1500 may be used to receive information, for example as transmitted from the wireless node 1400. For example, the wireless node 1500 may be any of the user terminals 120 illustrated in FIG. 1 or FIG. 2. In such aspect, the wireless node 1500 may be used to receive information transmitted using mapped symbols from the AP 110. Similarly, the wireless node 1500 may be the AP 110 illustrated in FIG. 1 or FIG. 2. In such aspect, the wireless node 1500 may be used to receive information transmitted with mapped symbols from one of the user terminals 120. The wireless node 1500 may be implemented as described with respect to the wireless device 302 illustrated in FIG. 3.

In FIG. 15, both a BCC mode 1510 and an LDPC mode 1520 are illustrated. The wireless node 1500, however, need not have both. In some aspects, the wireless mode 1500 is configured with only one of the modes 1510, 1520. For example, a legacy handset configured for early IEEE 802.11 communications may comprise only the BCC mode 1510.

In wireless nodes implementing both the BCC mode 1510 and the LDPC mode 1520, separate hardware and/or software may be used by the wireless node 1500 to implement each mode 1510, 1520, or common hardware and/or software may be used. For example, each numbered module illustrated in FIG. 15 may be implemented in a separate software module or using separate circuitry. In other aspects, the modes 1510 and 1520 may be implemented using shared or common modules or circuitry, for example that may have adjustable parameters or a plurality of modes. In one aspect, modules 1512-1518 are implemented using elements common to modules 1522-1528. When operating in the BCC mode 1510, for example, the wireless node 1500 deactivates a tone deinterleaver function 1523 and activates a deinterleaver 1517. When operating in the LDPC mode 1520, for example, the wireless node 1500 activates the tone deinterleaver function 1523, but deactivates the deinterleaver 1517.

In the BCC mode 1510, the wireless node 1500 may comprise an FFT module 1512 for outputting received modulation symbols in the frequency domain, for example, over tones in an OFDM symbol. The symbols may be received using a receiving module, for example the receiving module 1202 illustrated in FIG. 12. In some aspects, FFT modules 1512a and 1512b each output respective symbols. In some aspects, there is an FFT module for each spatial stream over which symbols are received, for example which may correspond to spatial streams transmitted by the wireless node 1400. In some aspects, the FFT module 1512 may be implemented using the RX data processor 270 or 242, or the controller 230 or 280, illustrated in FIG. 2. Further, the FFT module 1512 may be implemented using the processor 304 or the DSP 320 illustrated in FIG. 3. In some aspects, the FFT module 1512 is implemented using the receiving module 1202.

The wireless node 1500 may further comprise a spatial demapping module 1514 for separating the modulation symbols into one or more streams for processing. The streams demapped by the stream demapping module 1514 may correspond to logical spatial streams in some aspects (e.g., the logical spatial streams parsed at the wireless node 1400). In the illustrated aspect, the spatial demapping module 1514 splits the symbols into two separate streams. In some aspects, the spatial demapping module 1514 is omitted, and a single stream of symbols is passed to a slicer 1516. In other aspects, the spatial demapping module 1514 determines that only one stream will be processed. In some aspects, the spatial demapping module 1514 may split the symbols into more than two streams. In some aspects, up to eight streams may be concurrently processed at the wireless node 1500. In some aspects, there are fewer streams than antennas or an equal number of streams and antennas at the wireless node 1500. In some aspects, the spatial demapping module 1514 may be implemented using the RX data processor 270 or 242, or the controller 230 or 280, illustrated in FIG. 2. Further, the spatial demapping module 1514 may be implemented using the processor 304 or the DSP 320 illustrated in FIG. 3.

The slicer 1516 may quantize the symbols in a stream to a nearest ideal constellation point to use as estimates of transmitted symbols. Thus, the slicer 1516 may demodulate received symbols into a stream of bits. In some aspects, slicer 1516a and 1516b each demodulate symbols in respective streams. In some aspects, the slicer 1516 is configured similar to or implemented using the demodulator 1206 described above with respect to FIG. 12.

The deinterleaver 1517 may be configured to deinterleave the bits in the received symbols. The deinterleaver 1517 may rearrange the bits such that they are output in an order that is identical to or approximates an order of the bits before being interleaved, for example by the interleaver 1415 described above with respect to FIG. 14. In some aspects, deinterleavers 1517*a* and 1517*b* each deinterleave bits associated with respective streams. The deinterleaver 1517 may be implemented using the RX data processor 270 or 242, or the controller 230 or 280, illustrated in FIG. 2. Further, the deinterleaver 1517 may be implemented using the processor 304 or the DSP 320 illustrated in FIG. 3.

The wireless node 1500 may additionally comprise a stream deparser 1518 for combining the respective streams into a combined stream of bits for decoding. The stream deparser 1518 may reverse the parsing of bits performed by the stream parser 1414, for example. The stream deparser 1518 may be implemented using the RX data processor 270 or 242, or the controller 230 or 280, illustrated in FIG. 2. Further, the stream deparser 1518 may be implemented using the processor 304 or the DSP 320 illustrated in FIG. 3.

The wireless node 1500 may also include a decoder 1519 for decoding the bits in the combined stream. In one aspect, the decoder 1519 outputs a stream of bits representative of data transmitted by the wireless node 1400. For example, bits may be decoded based on a FEC code that was used to encode a stream of bits at the wireless node 1400. In the aspect illustrated in FIG. 15, the decoder 1519 comprises a BCC decoder configured to decode bits based on a BCC code. In some aspects, the decoder 1519 may be implemented using the RX data processor 270 or 242, or the controller 230 or 280, illustrated in FIG. 2. Further, the decoder 1519 may be implemented using the processor 304 or the DSP 320 illustrated in FIG. 3.

In the LDPC mode 1520, the wireless node 1500 may comprise an FFT module 1522 for outputting received modulation symbols in the frequency domain. In some aspects, FFT modules 1522*a* and 1522*b* each output respective symbols. The FFT module 1522 may be configured similar to the FFT module 1512, except that the FFT module 1522 includes the tone deinterleaver function 1523. The tone deinterleaver function 1523 may be configured to arrange symbols associated with a codeword and received over a permuted set of physical tones into an original configuration of logical tones for that codeword. For example, the tone deinterleaver function 1523 may reverse a tone interleaving performed by the tone interleaver 1427. In some aspects, tone interleaving performed by the wireless node 1400 is known a priori by the tone deinterleaver function 1523. In other aspects, information indicating the interleaving may be received at the wireless node 1500. This information may be transmitted over a control channel or included in a packet with one or more of the symbols, for example.

In some aspects, the wireless node 1500 receives all pilot tones first before it starts processing data tones. Information associated with the data tones may be stored in a memory, for example the memory 232 or 282 or 306, until all pilot tones have been output by the FFT module 1522. The deinterleaver function 1523 may read out memory in an interleaved or permuted order. In this way, no additional latency is introduced into the reception of symbols at the FFT module 1522 when compared to the processing of symbols by the FFT module 1512.

The tone deinterleaver function 1523 may be implemented separate from the FFT module 1522 or may be integral to the FFT module 1522. In some aspects, the FFT module 1522 may have different modes, for example, a mode implementing the tone deinterleaver function 1523 and a mode in which the tone deinterleaver function 1523 is not implemented. Thus, a common FFT module may be used in both the BCC mode 1510 and the LDPC mode 1520 by adjusting a mode or functionality of the FFT module.

In some aspects, the FFT module 1522 and/or the tone deinterleaver function 1523 may implement a portion or all of the deinterleaver 1204. The FFT module 1522 and/or the tone deinterleaver function 1523 may be implemented using the RX data processor 270 or 242, or the controller 230 or 280, illustrated in FIG. 2. Further, the FFT module 1522 and/or the tone deinterleaver function 1523 may be implemented using the processor 304 or the DSP 320 illustrated in FIG. 3.

The wireless node 1500 may further comprise a stream demapping module 1524 for separating the modulation symbols from the deinterleaved tones into one or more streams for processing. The streams demapped by the stream demapping module 1524 may correspond to logical spatial streams in some aspects (e.g., the logical spatial streams parsed at the wireless node 1400). The stream demapping module 1524 may be configured similar to the stream demapping module 1514.

The wireless node 1500 may additionally comprise a slicer 1526 for quantizing the symbols in a stream to a nearest ideal constellation point to use as estimates of transmitted symbols. The slicer 1526 may demodulate received symbols into bits associated with one or more codewords. In some aspects, slicers 1526*a* and 1526*b* each demodulate symbols in respective streams. In some aspects, the slicer 1516 is configured similar to or implemented using the demodulator 1206 described above with respect to FIG. 12.

The wireless node 1500 may also comprise a stream deparser 1528 for combining the bits associated with the one or more codewords for decoding. The stream deparser 1528 may reverse the parsing of bits performed by the stream parser 1424, for example. The stream deparser 1528 may be implemented using the RX data processor 270 or 242, or the controller 230 or 280, illustrated in FIG. 2. Further, the stream deparser 1528 may be implemented using the processor 304 or the DSP 320 illustrated in FIG. 3.

The wireless node 1500 may further include a decoder 1529 for decoding the bits associated with the one or more codewords into decoded bits. In one aspect, the decoder 1529 outputs a stream of bits representative of data transmitted by the wireless node 1400. For example, bits may be decoded based on a FEC code that was used to encode a stream of bits at the wireless node 1400. In the aspect illustrated in FIG. 15, the decoder 1529 comprises an LDPC decoder configured to decode bits based on an LDPC code. In some aspects, the decoder 1529 is configured similar to or implemented using the decoder 1208 described above with respect to FIG. 14.

Some of the modules illustrated in FIG. 15 are labeled with a reference numeral having an "a" or a "b" suffix. In some aspects, a single module instead of both an "a" and a "b" module is implemented in the wireless node 1500. In other aspects, additional modules are implemented. For example, a module for each spatial stream may be implemented. When there are more than two spatial streams received in a mode, modules in addition to an "a" and a "b" module may be included. Further, some of the modules illustrated in FIG. 15 are labeled with similar names. These modules may be implemented for each stream and/or mode, as shown, or there may be fewer modules than illustrated. In some aspects, one or more modules labeled with a similar name are combined into a common module, for example a common module with variable parameters or a common module configured to accept symbols or bits of different formats.

Figure 16:
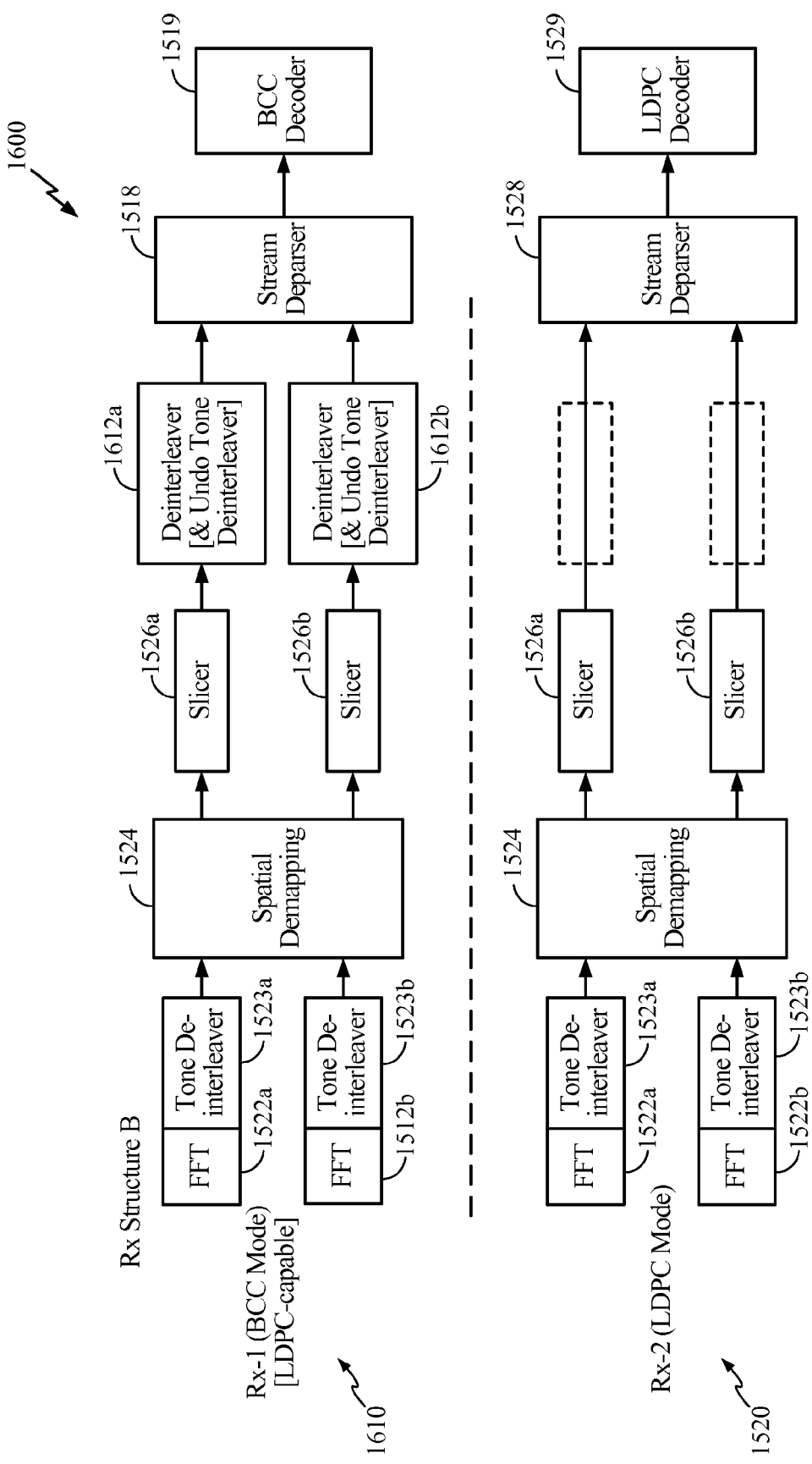

FIG. 16 illustrates an aspect of a wireless node 1600 for use within the system 100. The wireless node 1600 may be used to receive information, for example as transmitted from the wireless node 1400. For example, the wireless node 1600 may be any of the user terminals 120 illustrated in FIG. 1 or FIG. 2. In such aspects, the wireless node 1500 may be used to receive information transmitted using mapped symbols from the AP 110. Similarly, the wireless node 1600 may be the AP 110 illustrated in FIG. 1 or FIG. 2. In such an aspect, the wireless node 1600 may be used to receive information transmitted with mapped symbols from one of the user terminals 120. The wireless node 1600 may be implemented as described above with respect to the wireless device 302 illustrated in FIG. 3.

In FIG. 16, both a BCC mode 1610 and the LDPC mode 1520 described above with respect to FIG. 15 are illustrated. In the illustrated aspect, the wireless node 1600 may implement both the BCC mode 1610 and the LDPC mode 1520 with several shared elements in order to reduce complexity. Using the configuration shown in FIG. 16, the wireless node may receive communications that were encoded with a BCC encoder and were not processed for tone interleaving, as well as communications that were encoded with an LDPC encoder and were processed to interleave tones, without experiencing additional latency.

In the aspect illustrated in FIG. 16, separate elements are shown for the BCC mode 1610 and the LDPC mode 1520. Common hardware and/or software, however, may be used. For example, modules labeled with the same number in FIG. 16 may compose the same elements. Similarly, the stream deparser 1518 and the stream deparser 1528 may compose the same element. Thus, in some aspects, the same elements implement both the BCC mode 1610 and the LDPC mode 1520. In the BCC mode, however, a deinterleaver 1612 may be activated, while in the LDPC mode the deinterleaver 1612 may be deactivated.

In the BCC mode 1610, the wireless node 1600 may process received modulation symbols similar to the way in which modulation symbols are processed in the LDPC mode 1520 up until the deinterleaver 1612. For example, the modulation symbols received in a frequency domain may be output by the FFT module 1522, processed for tone deinterleaving by the tone deinterleaver function 1523, separated into streams by the stream demapping module 1524, and quantized to a constellation point by the slicer 1526.

As can be seen in FIG. 16, tone deinterleaving is performed by the tone deinterleaving function 1523 in the BCC mode 1610 even though the tones were not interleaved before being transmitted. Thus, the symbols output by the FFT modules 1522 and tone deinterleaving functions 1523 will be output in a permuted or interleaved order.

After the symbols corresponding to the interleaved tones are quantized to a constellation point by the slicer 1526, the deinterleaver 1612 deinterleaves the tones. Thus, the tones will be returned to an order in which they were received. Further, the deinterleaver 1612 deinterleaves the bits in the received symbols. The deinterleaving of the bits may be performed similar to the deinterleaving performed by the deinterleaver 1517 illustrated in FIG. 15 in the BCC mode 1510. The deinterleaving of tones and the deinterleaving of bits may be performed separately. For example, groups of bits that correspond to symbols may first be deinterleaved such that the logical tones of the symbols are placed in an original order, and then the resulting ordered bits deinterleaved as discussed above with respect to the deinterleaver 1517. In other aspects, the deinterleaving of tones and the deinterleaving of bits are performed with the same operation or substantially concurrently. For example, the deinterleaver 1612 may write bits into a table and then read the bits from the table in a different order or may determine an order of the bits mathematically, as discussed above. The deinterleaver 1612, however, may write bits into the table or read bits from the table such that bits will be output in a deinterleaved tone and bit order. Similarly, the order may be mathematically determined in this way.

In some aspects, deinterleavers 1612a and 1612b each deinterleave tones and bits associated with respective streams. The deinterleaver 1612 may be implemented using the RX data processor 270 or 242, or the controller 230 or 280, illustrated in FIG. 2. Further, the deinterleaver 1612 may be implemented using the processor 304 or the DSP 320 illustrated in FIG. 3.

The bits of the respective streams output from the deinterleaver 1612 are combined into a combined stream of bits for decoding by the stream deparser 1518. The combined stream is then decoded by the decoder 1519. The stream deparser 1518 and the decoder 1519 are described above with respect to FIG. 15, and operate in the same manner as described above.

As discussed above, the FFT module 1522 and the tone deinterleaver function 1523 may deinterleave tones in the BCC mode 1610 without introducing additional latency in comparison to the processing of signals at the FFT module 1512 in the BCC mode 1510. Further, both the BCC mode 1510 and the BCC mode 1610 both include a deinterleaver at a similar location in the processing of symbols (i.e., the deinterleaver 1517 and the deinterleaver 1612). The deinterleaver 1612 may be configured to deinterleave tones and bits with little or no additional latency compared to the deinterleaving of bits by the deinterleaver 1517, for example, when the deinterleaver 1612 is configured to substantially concurrently deinterleave the tones and bits. Thus, received modulation symbols may be processed in the BCC mode 1610 by the wireless node 1600 with no extra delay as compared to the processing of the received symbols in the BCC mode 1510 by the wireless node 1500.

In the aspect illustrated in FIG. 16, the BCC mode 1610 and the LDPC mode 1520 may be implemented using the same modules, with the exception of the deinterleaver 1612 and the decoder modules. Thus, when switching between processing symbols in the BCC mode 1610 and processing symbols in the LDPC mode 1520, only the deinterleaver 1612 may be deactivated, and the decoder may be switched. In some aspects, the deinterleaver is still used, but a mode of the deinterleaver 1612 is changed so that the deinterleaver passes bits through without performing any interleaving of tones or bits. Similarly, when switching from the LDPC mode 1520 to the BCC mode 1610, only the deinterleaver 1612 may be activated or may have a mode switched, and the decoder may be switched.

In contrast, when switching between the BCC mode 1510 and the LDPC mode 1520 in the wireless node 1500 when most of the same modules are used to implement the BCC mode 1510 and the LDPC mode 1520, both the tone deinterleaver function 1523 and the deinterleaver 1517 may be either activated or deactivated. Changing the mode of or selectively activating/deactivating the mode of the deinterleaver 1612 may, in some implementations or aspects, be less complex or processing intensive than changing the mode of or selectively activating/deactivating the mode of both the tone deinterleaver function 1523 and the deinterleaver 1517. Further, in some aspects or implementations, changing the mode of a deinterleaver such as the deinterleaver 1612 may be quicker and/or less complex than changing a mode of an FFT module comprising a tone deinterleaver function.

Those of skill in the art will appreciate that a wireless node that interleaves physical tones of symbols for transmission may therefore be operated without any additional latency as compared to a wireless node that does not perform such interleaving. Further, a wireless node that receives and processes symbols having interleaved tones may therefore be operated without additional latency as compared to a wireless node that receives and process symbols that do not have interleaved tones. In addition, a wireless node that switches between functionalities corresponding to interleaved tones and non-interleaved tones may be operated without additional latency as compared to a wireless node that does not switch between such functionalities.

Some of the modules illustrated in FIG. 16 are labeled with a reference numeral having an "a" or a "b" suffix. In some aspects, a single module instead of both an "a" and a "b" module is implemented in the wireless node 1600. In other aspects, additional modules are implemented. For example, a module for each spatial stream may be implemented. When there are more than two spatial streams received in a mode, modules in addition to an "a" and a "b" module may be included. Further, some of the modules illustrated in FIG. 16 are labeled with similar names. These modules may be implemented for each stream and/or mode, as shown, or there may be fewer modules than illustrated. In some aspects, one or more modules labeled with a similar name are combined into a common module, for example a common module with variable parameters or a common module configured to accept symbols or bits of different formats.

Those of skill in the art will appreciate various circuits, chips, modules, and/or components, which may comprise either software or hardware or both, that may be used to implement the modules described above with respect to the wireless nodes 400, 1200, 1400, 1500, and 1600. One or more of the modules of the wireless nodes 400, 1200 may be partially or wholly implemented in the processor 304 illustrated in FIG. 3.

Although described separately, it is to be appreciated that functional blocks described with respect to the wireless nodes 400, 1200, 1400, 1500, and 1600 need not be separate structural elements. Similarly, one or more of the functional blocks or portions of the functionality of various blocks may be embodied in a single chip. Alternatively, the functionality of a particular block may be implemented on two or more chips. In addition, additional modules or functionality may be implemented in the wireless nodes 400, 1200, 1400, 1500, and 1600. Similarly, fewer modules or functionalities may be implemented in the wireless nodes 400, 1200, 1400, 1500, and 1600, and the components of the wireless nodes 400, 1200, 1400, 1500, and/or 1600 may be arranged in any of a plurality of configurations. Additional or fewer couplings between the various modules illustrated in FIGS. 4, 12, and 14-16 or between additional modules may be implemented.

Figure 11A:
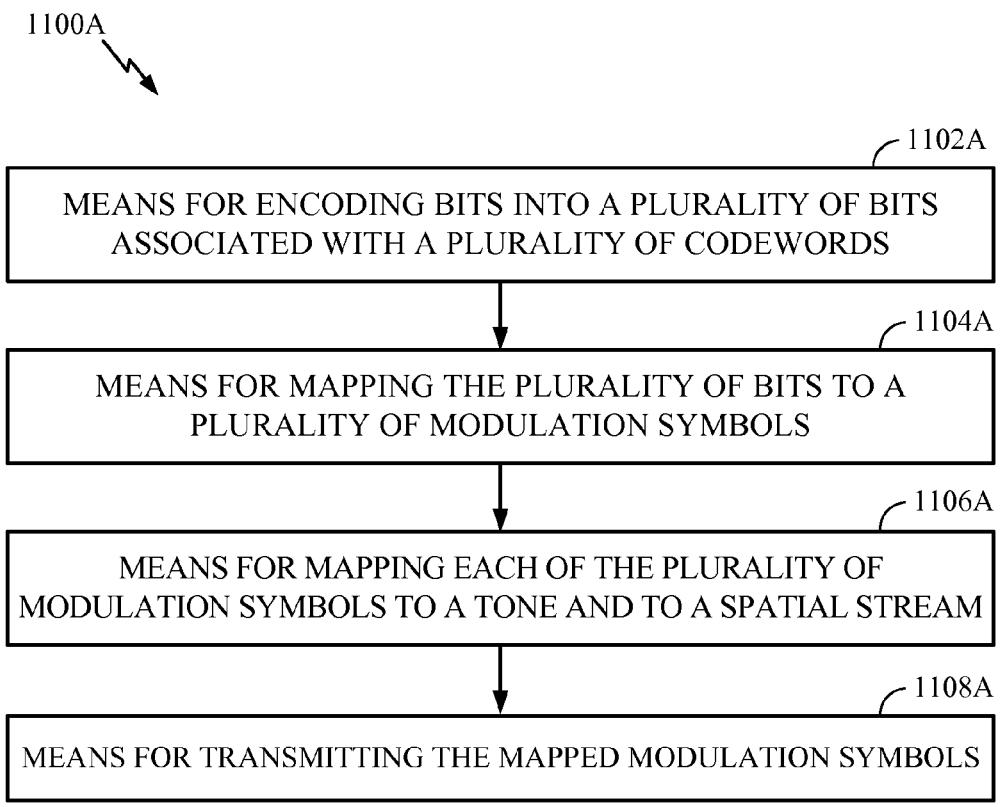
FIG. 11A illustrates example means for performing the operations shown in FIG. 11.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations, modules, or steps illustrated in the figures, those operations may have corresponding counterpart means-plus-function components with similar numbering. For example, operations 1100 illustrated in FIG. 11 correspond to means 1100A illustrated in FIG. 11A.

For example, a wireless node may comprise means for encoding bits, means for mapping a plurality of bits to a plurality of modulation symbols, means for mapping each of the plurality of modulation symbols to a tone and a spatial stream, and means for transmitting the mapped modulation symbols. The means components in such a wireless node correspond generally to the operations 1100 illustrated in FIG. 11. As another example, a wireless node may comprise means for receiving a plurality of modulation symbols corresponding to bits associated with a plurality of codewords over a tone and a spatial stream, means for arranging symbols received for a codeword into an original order of the codeword, and means for decoding bits. The means components in such a wireless node generally correspond to the operations 1300 illustrated in FIG. 13.

In some aspects, means for transmitting may be implemented by the transmitting module 408. Means for transmitting may comprise a transmitter and at least one antenna, as described above with respect to the transmitting module 408.

In some aspects, means for receiving may be implemented by the receiving module 1202. Means for receiving may comprise a receiver and at least one antenna, as described above with respect to the receiving module 1202.

In some aspects, means for mapping, means for encoding, means for decoding, and/or means for arranging may be implemented by one or more of the modules illustrated in FIGS. 4, 12, and 14-16. For example, means for mapping, means for encoding, means for decoding, and/or means for arranging may be implemented by a processing system, controller, RX data processor, and/or TX scheduler, as described above with respect to the modules illustrated in FIGS. 4 and 12. For example, such means may be implemented using a microprocessor, microcontroller, DSP, FPGA, PLD, or other hardware or software components. In some aspects, the means for mapping and/or the means for arranging are implemented in an FFT or an IFFT module.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitter over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communications, comprising:
a processing system configured to:
map a plurality of bits to a plurality of modulation symbols, the plurality of bits being associated with a plurality of codewords; and
map each of the plurality of modulation symbols to a tone and a spatial stream, the tone being one of a plurality of tones available for transmission and the spatial stream being one of a plurality of spatial streams available for the transmission, wherein a subset of the plurality of modulation symbols corresponding to consecutive bits associated with one of the plurality of codewords is approximately uniformly mapped among the plurality of spatial streams and wherein the modulation symbols of the subset that are mapped to the same spatial stream are mapped to non-adjacent tones in the plurality of tones, based on a tone-mapping distance parameter; and
a transmitter configured to transmit the mapped modulation symbols.

2. The apparatus of claim 1, wherein the modulation symbols of the subset are approximately uniformly mapped to the plurality of tones.

3. The apparatus of claim 1, wherein the processing system is configured to map each of the plurality of modulation symbols by:
mapping a first modulation symbol in the subset to a first tone and a first spatial stream;
mapping a second modulation symbol of the subset to the first tone and a second spatial stream; and
mapping a third modulation symbol of the subset to a second tone and a third spatial stream, wherein the first and second tones are not adjacent, wherein bits corresponding to the second modulation symbol immediately follow bits corresponding to the first modulation symbol in the one of the plurality of codewords, and wherein bits corresponding to the third modulation symbol immediately follow the bits corresponding to the second modulation symbol in the one of the plurality of codewords.

4. The apparatus of claim 3, wherein the second spatial stream is adjacent the first spatial stream.

5. The apparatus of claim 1, wherein the modulation symbols of the subset are mapped to a matrix correlating the plurality of tones to the plurality of spatial streams and wherein the $i^{th}$ modulation symbol in the subset is mapped to a spatial stream having a spatial stream index of i mod $N_S$ and to a tone having a tone index of floor($i/N_S$)×D, where $N_S$ is a number of spatial streams in the plurality of spatial streams and D is the tone-mapping distance parameter.

6. The apparatus of claim 5, wherein the tone-mapping distance parameter D comprises one of floor($N_{st}/N_{sc}$), ceil($N_{st}/N_{sc}$), or a number that is constant for a plurality of distinct values of $N_{st}$, where $N_{st}$ is a number of the modulation symbols in a transmission symbol and where $N_{sc}$ is a number of the modulation symbols in the one of the plurality of codewords.

7. The apparatus of claim 5, wherein the modulation symbols that correspond to the one of the plurality of codewords and are not in the subset are mapped to the matrix and wherein the $k^{th}$ modulation symbol is mapped to a tone having a tone index of k and to a spatial stream having a spatial stream index of max(i) mod $N_S$ if max(i) is not divisible by $N_S$ or max(i) mod $N_S$+1 if max(i) is divisible by $N_S$.

8. The apparatus of claim 1, further comprising an encoder configured to encode bits using a low-density parity-check (LDPC) code, wherein the encoded bits comprise the plurality of bits.

9. The apparatus of claim 1, wherein the processing system is configured to map each of the plurality of modulation symbols such that logical tones of the plurality of modulation symbols are permuted with respect to physical tones used to transmit the plurality of modulation symbols, wherein the processing system comprises an inverse fast Fourier transform (IFFT) module to perform the mapping.

10. A method for wireless communications, comprising:
mapping a plurality of bits to a plurality of modulation symbols, the plurality of bits being associated with a plurality of codewords;
mapping each of the plurality of modulation symbols to a tone and a spatial stream, the tone being one of a plurality of tones available for transmission and the spatial stream being one of a plurality of spatial streams available for the transmission, wherein a subset of the plurality of modulation symbols corresponding to consecutive bits associated with one of the plurality of codewords is approximately uniformly mapped among the plurality of spatial streams and wherein the modulation symbols of the subset that are mapped to the same spatial stream are mapped to non-adjacent tones in the plurality of tones, based on a tone-mapping distance parameter; and
transmitting the mapped modulation symbols.

11. The method of claim 10, wherein the modulation symbols of the subset are approximately uniformly mapped to the plurality of tones.

12. The method of claim 10, wherein mapping each of the plurality of modulation symbols comprises:

mapping a first modulation symbol in the subset to a first tone and a first spatial stream;
mapping a second modulation symbol of the subset to the first tone and a second spatial stream; and
mapping a third modulation symbol of the subset to a second tone and a third spatial stream, wherein the first and second tones are not adjacent, wherein bits corresponding to the second modulation symbol immediately follow bits corresponding to the first modulation symbol in the one of the plurality of codewords, and wherein bits corresponding to the third modulation symbol immediately follow the bits corresponding to the second modulation symbol in the one of the plurality of codewords.

13. The method of claim 12, wherein the second spatial stream is adjacent the first spatial stream.

14. The method of claim 10, wherein the modulation symbols of the subset are mapped to a matrix correlating the plurality of tones to the plurality of spatial streams and wherein the $i^{th}$ modulation symbol in the subset is mapped to a spatial stream having a spatial stream index of i mod $N_S$ and to a tone having a tone index of floor($i/N_S$)×D, where $N_S$ is a number of spatial streams in the plurality of spatial streams and D is the tone-mapping distance parameter.

15. The method of claim 14, wherein the tone-mapping distance parameter D comprises one of floor($N_{st}/N_{sc}$), ceil ($N_{st}/N_{sc}$), or a number that is constant for a plurality of distinct values of $N_{st}$, where $N_{st}$ is a number of the modulation symbols in a transmission symbol and where $N_{sc}$ is a number of the modulation symbols in the one of the plurality of codewords.

16. The method of claim 14, wherein the modulation symbols that correspond to the one of the plurality of codewords and are not in the subset are mapped to the matrix and wherein the $k^{th}$ modulation symbol is mapped to a tone having a tone index of k and to a spatial stream having a spatial stream index of max(i) mod $N_S$ if max(i) is not divisible by $N_S$ or max(i) mod $N_S+1$ if max(i) is divisible by $N_S$.

17. The method of claim 10, further comprising encoding bits using a low-density parity-check (LDPC) code, the encoded bits comprising the plurality of bits.

18. The method of claim 10, wherein mapping each of the plurality of modulation symbols comprises mapping each of the plurality of modulation symbols such that logical tones of the plurality of modulation symbols are permuted with respect to physical tones used to transmit the plurality of modulation symbols, wherein the mapping is performed by an inverse fast Fourier transform (IFFT) module.

19. An apparatus for wireless communications, comprising:
means for mapping a plurality of bits to a plurality of modulation symbols, the plurality of bits being associated with a plurality of codewords;
means for mapping each of the plurality of modulation symbols to a tone and a spatial stream, the tone being one of a plurality of tones available for transmission and the spatial stream being one of a plurality of spatial streams available for the transmission, wherein a subset of the plurality of modulation symbols corresponding to consecutive bits associated with one of the plurality of codewords is approximately uniformly mapped among the plurality of spatial streams and wherein the modulation symbols of the subset that are mapped to the same spatial stream are mapped to non-adjacent tones in the plurality of tones, based on a tone-mapping distance parameter; and
means for transmitting the mapped modulation symbols.

20. The apparatus of claim 19, wherein the modulation symbols of the subset are approximately uniformly mapped to the plurality of tones.

21. The apparatus of claim 19, wherein the means for mapping each of the plurality of modulation symbols is configured to:
map a first modulation symbol in the subset to a first tone and a first spatial stream;
map a second modulation symbol of the subset to the first tone and a second spatial stream; and
map a third modulation symbol of the subset to a second tone and a third spatial stream, wherein the first and second tones are not adjacent, wherein bits corresponding to the second modulation symbol immediately follow bits corresponding to the first modulation symbol in the one of the plurality of codewords, and wherein bits corresponding to the third modulation symbol immediately follow the bits corresponding to the second modulation symbol in the one of the plurality of codewords.

22. The apparatus of claim 21, wherein the second spatial stream is adjacent the first spatial stream.

23. The apparatus of claim 19, wherein the modulation symbols of the subset are mapped to a matrix correlating the plurality of tones to the plurality of spatial streams and wherein the $i^{th}$ modulation symbol in the subset is mapped to a spatial stream having a spatial stream index of i mod $N_S$ and to a tone having a tone index of i or floor($i/N_S$)×D, where $N_S$ is a number of spatial streams in the plurality of spatial streams and D is the tone-mapping distance parameter.

24. The apparatus of claim 23, wherein the tone-mapping distance parameter D comprises one of floor ($N_{st}/N_{sc}$), ceil ($N_{st}/N_{sc}$), or a number that is constant for a plurality of distinct values of $N_{st}$, where $N_{st}$ is a number of the modulation symbols in a transmission symbol and where $N_{sc}$ is a number of the modulation symbols in the one of the plurality of codewords.

25. The apparatus of claim 23, wherein the modulation symbols that correspond to the one of the plurality of codewords and are not in the subset are mapped to the matrix and wherein the $k^{th}$ modulation symbol is mapped to a tone having a tone index of k and to a spatial stream having a spatial stream index of max(i) mod $N_S$ if max(i) is not divisible by $N_S$ or max(i) mod $N_S+1$ if max(i) is divisible by $N_S$.

26. The apparatus of claim 19, further comprising means for encoding bits using a low-density parity-check (LDPC) code, wherein the encoded bits comprise the plurality of bits.

27. The apparatus of claim 19, wherein the means for mapping each of the plurality of modulation symbols is configured to map each of the plurality of modulation symbols such that logical tones of the plurality of modulation symbols are permuted with respect to physical tones used to transmit the plurality of modulation symbols and wherein the means for mapping each of the plurality of modulation symbols comprises an inverse fast Fourier transform (IFFT) module to perform the mapping.

28. A computer program product for wireless communications, comprising a non-transitory computer-readable medium comprising instructions that, when executed, cause an apparatus to:
map a plurality of bits to a plurality of modulation symbols, the plurality of bits being associated with a plurality of codewords;
map each of the plurality of modulation symbols to a tone and a spatial stream, the tone being one of a plurality of tones available for transmission and the spatial stream being one of a plurality of spatial streams available for the transmission, wherein a subset of the plurality of modulation symbols corresponding to consecutive bits associated with one of the plurality of codewords is approximately uniformly mapped among the plurality of spatial streams and wherein the modulation symbols of the subset that are mapped to the same spatial stream are mapped to non-adjacent tones in the plurality of tones, based on a tone-mapping distance parameter; and transmit the mapped modulation symbols.

29. A wireless node, comprising:

at least one antenna;

a processing system configured to map a plurality of bits to a plurality of modulation symbols, the plurality of bits being associated with a plurality of codewords; and map each of the plurality of modulation symbols to a tone and a spatial stream, the tone being one of a plurality of tones available for transmission and the spatial stream being one of a plurality of spatial streams available for the transmission, wherein a subset of the plurality of modulation symbols corresponding to consecutive bits associated with one of the plurality of codewords is approximately uniformly mapped among the plurality of spatial streams and wherein the modulation symbols of the subset that are mapped to the same spatial stream are mapped to non-adjacent tones in the plurality of tones, based on a tone-mapping distance parameter; and a transmitter configured to transmit, via the at least one antenna, the mapped modulation symbols.

30. An apparatus for wireless communications, comprising:

a receiver configured to receive a plurality of modulation symbols corresponding to bits associated with a plurality of codewords over a plurality of tones and a plurality of spatial streams, wherein a subset of the plurality of modulation symbols corresponding to consecutive bits associated with one of the plurality of codewords is approximately uniformly distributed over the plurality of spatial streams and wherein the modulation symbols of the subset that are received in the same spatial stream are distributed over non-adjacent tones in the plurality of tones, based on a tone-mapping distance parameter; and a deinterleaver configured to arrange the subset of the received modulation symbols into an original order of the one of the plurality of codewords.

31. The apparatus of claim 30, wherein the deinterleaver is configured to permute physical tones over which the plurality of modulation symbols are received to arrange the plurality of modulation symbols into a plurality of logical tones.

32. The apparatus of claim 31, wherein the deinterleaver comprises a fast Fourier transform (FFT) module configured to perform the permutation.

33. A method for wireless communications, comprising:

receiving a plurality of modulation symbols corresponding to bits associated with a plurality of codewords over a plurality of tones and a plurality of spatial streams, wherein a subset of the plurality of modulation symbols corresponding to consecutive bits associated with one of the plurality of codewords is approximately uniformly distributed over the plurality of spatial streams and wherein the modulation symbols of the subset that are received in the same spatial stream are distributed over non-adjacent tones in the plurality of tones, based on a tone-mapping distance parameter; and arranging the subset of the received modulation symbols into an original order corresponding to the one of the plurality of codewords.

34. The method of claim 33, wherein the arranging comprises permuting physical tones over which the plurality of modulation symbols are received to arrange the plurality of modulation symbols into a plurality of logical tones.

35. The method of claim 34, wherein the permutation is performed by a fast Fourier transform (FFT) module.

36. An apparatus for wireless communications, comprising:

means for receiving a plurality of modulation symbols corresponding to bits associated with a plurality of codewords over a plurality of tones and a plurality of spatial streams, wherein a subset of the plurality of modulation symbols corresponding to consecutive bits associated with one of the plurality of codewords is approximately uniformly distributed over the plurality of spatial streams and wherein the modulation symbols of the subset that are received in the same spatial stream are distributed over non-adjacent tones in the plurality of tones, based on a tone-mapping distance parameter; and means for arranging the subset of the received modulation symbols into an original order corresponding to the one of the plurality of codewords.

37. The apparatus of claim 36, wherein the means for arranging is configured to permute physical tones over which the plurality of modulation symbols are received to arrange the plurality of modulation symbols into a plurality of logical tones.

38. The apparatus of claim 37, wherein the means for arranging comprises a fast Fourier transform (FFT) module configured to perform the permutation.

39. A computer program product for wireless communications, comprising a non-transitory computer-readable medium comprising instructions that, when executed, cause an apparatus to:

receive a plurality of modulation symbols corresponding to bits associated with a plurality of codewords over a plurality of tones and a plurality of spatial streams, wherein a subset of the plurality of modulation symbols corresponding to consecutive bits associated with one of the plurality of codewords is approximately uniformly distributed over the plurality of spatial streams and wherein the modulation symbols of the subset that are received in the same spatial stream are distributed over non-adjacent tones in the plurality of tones, based on a tone-mapping distance parameter; and arrange the subset of the received modulation symbols into an original order corresponding to the one of the plurality of codewords.

40. A wireless node, comprising:

at least one antenna;

a receiver configured to receive, via the at least one antenna, a plurality of modulation symbols corresponding to bits associated with a plurality of codewords over a plurality of tones and a plurality of spatial streams, wherein a subset of the plurality of modulation symbols corresponding to consecutive bits associated with one of the plurality of codewords is approximately uniformly distributed over the plurality of spatial streams and wherein the modulation symbols of the subset that are received in the same spatial stream are distributed over non-adjacent tones in the plurality of tones, based on a tone-mapping distance parameter; and a deinterleaver configured to arrange the subset of the received modulation symbols into an original order corresponding to the one of the plurality of codewords.

* * * * *